US008676458B2

(12) United States Patent  
Tanaka et al.

(10) Patent No.: US 8,676,458 B2  
(45) Date of Patent: Mar. 18, 2014

(54) AUTOMATIC CLUTCH CONTROL DEVICE AND GEAR CHANGE CONTROL METHOD THEREFOR

(75) Inventors: Masayuki Tanaka, Kariya (JP); Takeshige Miyazaki, Chiryu (JP)

(73) Assignee: Aisin AI Co., Ltd., Nishio-shi (JP)

( * ) Notice: Subject to any disclaimer, the term of this patent is extended or adjusted under 35 U.S.C. 154(b) by 0 days.

(21) Appl. No.: 13/610,059

(22) Filed: Sep. 11, 2012

(65) Prior Publication Data

US 2013/0073154 A1 Mar. 21, 2013

(30) Foreign Application Priority Data

Sep. 20, 2011 (JP) ................. 2011-204185

(51) Int. Cl.  
*G06F 17/00* (2006.01)

(52) U.S. Cl.  
USPC ........................................... 701/54

(58) Field of Classification Search  
USPC ........................................... 701/54  
See application file for complete search history.

(56) References Cited

U.S. PATENT DOCUMENTS

| 8,016,722 | B2 * | 9/2011 | Heinzelmann et al. | ....... 477/107 |
| 2004/0192504 | A1 * | 9/2004 | Kumazawa | .................... 477/166 |
| 2008/0248922 | A1 * | 10/2008 | Heinzelmann et al. | ....... 477/109 |
| 2010/0250050 | A1 * | 9/2010 | Ayabe | .............................. 701/29 |
| 2011/0034298 | A1 * | 2/2011 | Doering et al. | .................. 477/54 |
| 2011/0167957 | A1 | 7/2011 | Kato et al. | |
| 2012/0059563 | A1 * | 3/2012 | Sakaguchi et al. | .............. 701/70 |
| 2012/0184407 | A1 * | 7/2012 | Gentile et al. | ................. 477/118 |

FOREIGN PATENT DOCUMENTS

| DE | 198 44 375 A1 | 4/2000 |
| DE | 10 2007 042 772 A1 | 4/2008 |
| EP | 0825058 A2 | 2/1998 |
| EP | 1439087 A2 | 7/2004 |
| JP | 10-318288 | 12/1998 |
| JP | 2008-75814 | 4/2008 |
| JP | 2011-144872 | 7/2011 |

OTHER PUBLICATIONS

Office Action mailed Dec. 10, 2013 in German Patent Application No. 10 2012 108 337.1 (With English Translation).  
Sequenzielles M-Getriebe der zw eiten Generation m it Drive logic, Teil 1, in ATZ, Nov. 2001, Jahrgang 103, pp. 1024-1035.  
Sequenzielles M-Getriebe der zw eatien Generation m it Drive logic, Teil 2, in ATZ Feb. 2002 Jahrgang 104, pp. 154-163.

* cited by examiner

*Primary Examiner* — Mary Cheung  
*Assistant Examiner* — Anne Mazzara  
(74) *Attorney, Agent, or Firm* — Oblon, Spivak, McClelland, Maier & Neustadt, L.L.P.

(57) ABSTRACT

An automatic clutch control device comprises a clutch interposed between a prime move and an input shaft of a transmission; a target clutch torque calculation section; a gear change control section; an accelerator pressing-down speed detecting section; a judging section for judging whether or not the accelerator pressing-down speed exceeds at least one predetermined pressing-down speed threshold value; a prime mover rotational speed increasing control section operated when the accelerator pressing-down speed exceeds the threshold value, for disconnecting the input shaft and the prime mover and then for controlling the prime mover rotational speed to increase and come to be equal to the input shaft rotational speed which has been increased by a lower speed gear stage having been established; and a target clutch torque change calculation section for calculating a change amount that changes the target clutch torque in dependence on the magnitude of the accelerator pressing-down speed.

8 Claims, 6 Drawing Sheets

AUTOMATIC CLUTCH CONTROL DEVICE AND GEAR CHANGE CONTROL METHOD THEREFOR

INCORPORATION BY REFERENCE

This application is based on and claims priority under 35 U.S.C. 119 with respect to Japanese patent application No. 2011-204185 filed on Sep. 20, 2011, the entire content of which is incorporated herein by reference.

BACKGROUND OF THE INVENTION

1. Field of the Invention

The present invention relates to an automatic clutch control device and a gear change control method therefor which perform an automatic engaging control of a clutch at the time of the starting and stop of a vehicle and a gear change.

2. Discussion of the Related Art

In automatic clutch control devices in the prior art, in order to suppress a gear change shock at the time of the engagement of a clutch, it may be the case that the rotational speed of an engine is changed at a predetermined change speed to be synchronized with the rotational speed of an input shaft of a transmission. In this case, the clutch torque of the clutch is set to become a predetermined target value, so that it is possible to control the change speed in the rotational speed of the engine. Because of being fluctuated in dependence on an engaging degree of the clutch (the engaging amount of the clutch), the clutch torque of the clutch can be adjusted by controlling the operation amount of an actuator which operates the clutch.

For example, in JP10-318288 A, there is set a reference value for the engaging amount of the clutch that is used in obtaining a target clutch torque based on an accelerator opening degree and a vehicle speed. The target clutch torque is calculated first by calculating a target inertia torque by multiplying the inertia of the engine with a target rotational speed changing speed of the engine in a gear change and then by subtracting the target inertia torque from a current output torque of the engine. Thus, it results that the magnitude of the target clutch torque calculated in this way is set as the magnitude depending on the operating degree (pressing-down amount) of an accelerator which determines the current output torque of the engine.

As described above, in the engaging control of a clutch in the prior art, even when the driver presses down on the accelerator at a high speed for a large acceleration, the magnitude of the target clutch torque is determined in dependence upon the pressing-down amount of the accelerator without taking such pressing-down speed into consideration. Therefore, there occurs a situation that an acceleration wanted by the driver cannot be attained and hence, that the demand of the driver cannot be satisfied.

SUMMARY OF THE INVENTION

It is therefore an object of the present invention to provide an automatic clutch control device for a transmission and a gear change control method therefor that are capable of realizing a driver-demanded acceleration by controlling a clutch based on a target clutch torque which is set in dependence on the pressing-down speed of the accelerator by the driver.

Briefly, according to one aspect of the present invention, there is provided an automatic clutch control device, which comprises a clutch interposed between a driving shaft of a prime mover for a vehicle and an input shaft of a transmission; a clutch actuator for controlling the disconnection and connection of the clutch; a target clutch torque calculation section for calculating a target clutch torque; a gear change control section responsive to a gear change command for controlling a clutch torque transmitted from the prime mover to the input shaft by the operation of the clutch actuator to perform a disconnection control that disconnects the clutch and for controlling the clutch torque to become the target clutch torque to perform an engaging control that synchronizes the prime mover rotational speed of the prime mover with the input shaft rotational speed of the input shaft; a prime mover rotational speed detecting section for detecting as prime mover rotational speed the rotational speed of the driving shaft of the prime mover; an input shaft rotational speed detecting section for detecting the input shaft rotational speed of the input shaft; an accelerator pressing-down speed detecting section for detecting the pressing-down and the pressing-down speed of an accelerator; a pressing-down speed threshold value judging section for judging whether or not the accelerator pressing-down speed detected by the accelerator pressing-down speed detecting section exceeds at least one predetermined pressing-down speed threshold value, when a downshift gear change command for a gear change from a higher gear stage to a lower gear stage is outputted after the pressing-down of the accelerator is detected; a prime mover rotational speed increasing control section operated when the accelerator pressing-down speed exceeds the at least one predetermined pressing-down speed threshold value, for disconnecting the input shaft and the prime mover by the disconnection control of the clutch and then for controlling the prime mover rotational speed to increase and come to be equal to the input shaft rotational speed of the input shaft which has been increased by the lower speed gear stage, having been established in response to the gear change command, beyond the input shaft rotational speed before the gear change; and a target clutch torque change calculation section for calculating a change amount that changes the target clutch torque in dependence on the magnitude of the accelerator pressing-down speed.

With this construction, when the gear change command for downshift is outputted and when the accelerator pressing-down speed is detected to have exceeded the at least one predetermined pressing-down speed threshold value, first of all, the clutch being in connection is disconnected to disconnect the input shaft and the prime mover. Then, the prime mover rotational speed is controlled by the prime mover rotational speed increasing control section to come to be equal to the input shaft rotational speed of the input shaft which has been increased in rotational speed beyond the prime mover rotational speed as a result that a gear stage on the lower speed gear stage side is established. Then, when the prime mover rotational speed comes to be equal to the input shaft rotational speed, the engaging control of the clutch is performed by the changed target clutch torque which has been changed by the target clutch torque calculation section in dependence on the magnitude of the accelerator pressing-down speed and which is larger than the target clutch torque. In this way, if the accelerator pressing-down speed being a barometer representing the driver's will for acceleration is larger than the at least one predetermined pressing-down speed threshold value, the prime mover rotational speed of the prime mover is controlled to come to be equal to the input shaft rotational speed, and the clutch is engaged by the changed target clutch torque which has been changed to increase in dependence on the magnitude of the accelerator pressing-down speed. Therefore, the clutch can be engaged in a short period of time without bringing about a shock and a decrease in torque, so that the driver's demand for acceleration can be fulfilled.

In another aspect of the present invention, there is provided a gear change control method for an automatic clutch control device which comprises a clutch interposed between a driving shaft of a prime mover for a vehicle and an input shaft of a transmission; a clutch actuator for controlling disconnection and connection of the clutch; a target clutch torque calculation section for calculating a target clutch torque; a gear change control section responsive to a gear change command for controlling a clutch torque transmitted from the prime mover to the input shaft by the operation of the clutch actuator to perform a disconnection control that disconnects the clutch, and for controlling the clutch torque to become the target clutch torque to perform an engaging control that synchronizes the prime mover rotational speed of the prime mover with the input shaft rotational speed of the input shaft; a prime mover rotational speed detecting section for detecting the rotational speed of the driving shaft of the prime mover as prime mover rotational speed; and an input shaft rotational speed detecting section for detecting the input shaft rotational speed of the input shaft. The gear change control method comprises an accelerator pressing-down speed detecting step of detecting the pressing-down and the pressing-down speed of the accelerator; a pressing-down speed threshold value judging step of judging whether or not the accelerator pressing-down speed detected by the accelerator pressing-down speed detecting section exceeds at least one predetermined pressing-down speed threshold value, when a downshift gear change command for a gear change from a higher gear stage to a lower gear stage is outputted after the pressing-down of the accelerator is detected; a prime mover rotational speed increasing control step of, when the accelerator pressing-down speed exceeds the at least one predetermined pressing-down speed threshold value, disconnecting the input shaft and the prime mover by the disconnection control of the clutch and then controlling the prime mover rotational speed to increase and come to be equal to the input shaft rotational speed of the input shaft which has been increased by the lower speed gear stage, having been established in response to the gear change command, beyond the input shaft rotational speed before the gear change; and a target clutch torque changing calculation step of calculating a change amount that changes the target clutch torque in dependence on the magnitude of the accelerator pressing-down speed.

With this construction in the another aspect of the present invention, the same effects as those in the first aspect of the present invention can be achieved.

BRIEF DESCRIPTION OF THE DRAWINGS

The foregoing and other objects and many of the attendant advantages of the present invention may readily be appreciated as the same becomes better understood by reference to the preferred embodiment of the present invention when considered in connection with the accompanying drawings, wherein like reference numerals designate the same or corresponding parts throughout several views, and in which.

DETAILED DESCRIPTION OF THE PREFERRED EMBODIMENT

Figure 1:
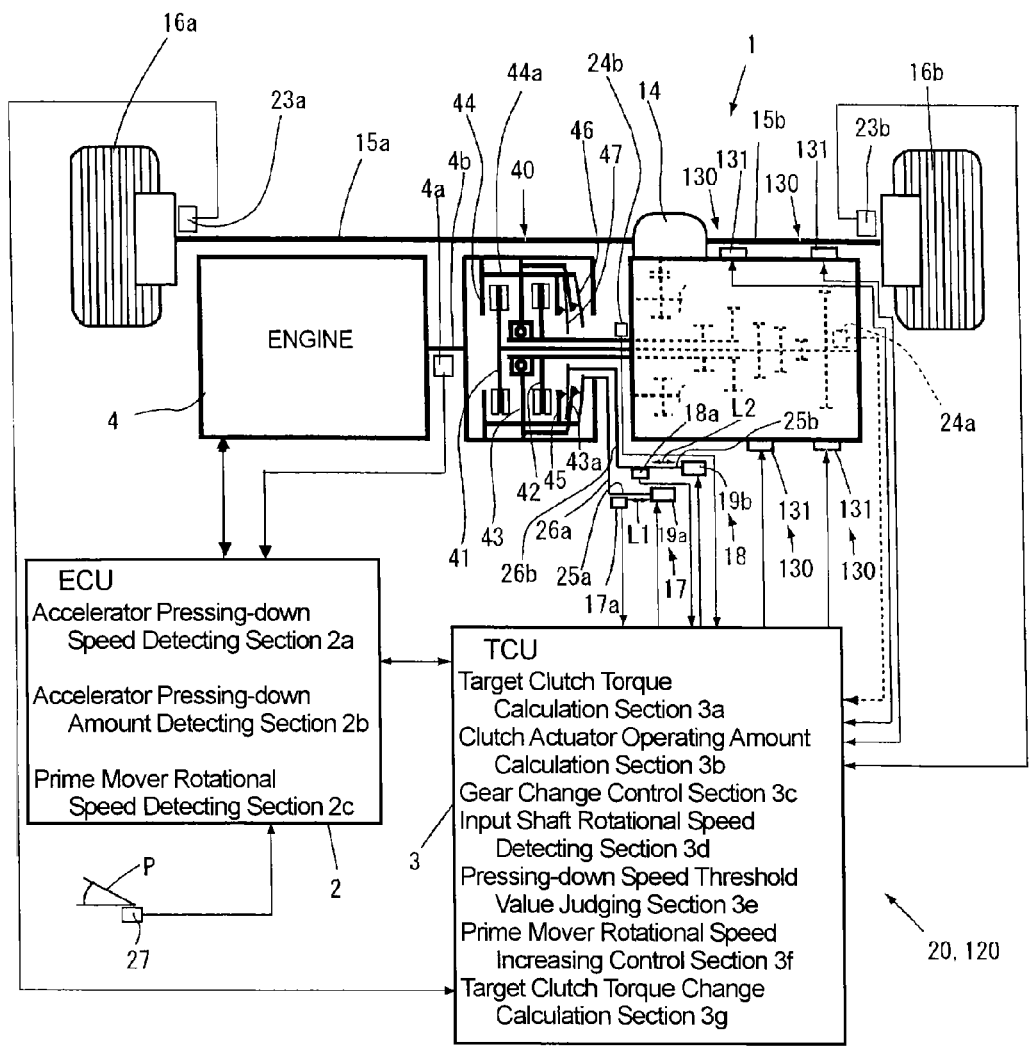
FIG. 1 is a block diagram showing the construction in part of a vehicle to which an automatic clutch control device and a gear change control method therefor according to the present invention are applicable.

Hereafter, an automatic dual clutch transmission incorporating an automatic clutch control device in a first embodiment according to the present invention will be described with reference to FIGS. 1 to 7. FIG. 1 is a block diagram showing the construction of a part of a vehicle to which an automatic dual clutch transmission 1 is applicable. The vehicle shown in FIG. 1 is a vehicle of the FF (Front Engine-Front Drive) type and is provided with an engine 4 being an example of a prime mover and driven by the combustion of gasoline, the automatic dual clutch transmission 1, the automatic clutch control device 20 according to the present invention, a differential gear device 14, driving shafts 15a, 15b, driving wheels 16a, 16b (front wheels), and driven wheels (rear wheels not shown). FIG. 1 is a top view of the vehicle, and the upper part of FIG. 1 corresponds to the front side of the vehicle.

Figure 2:
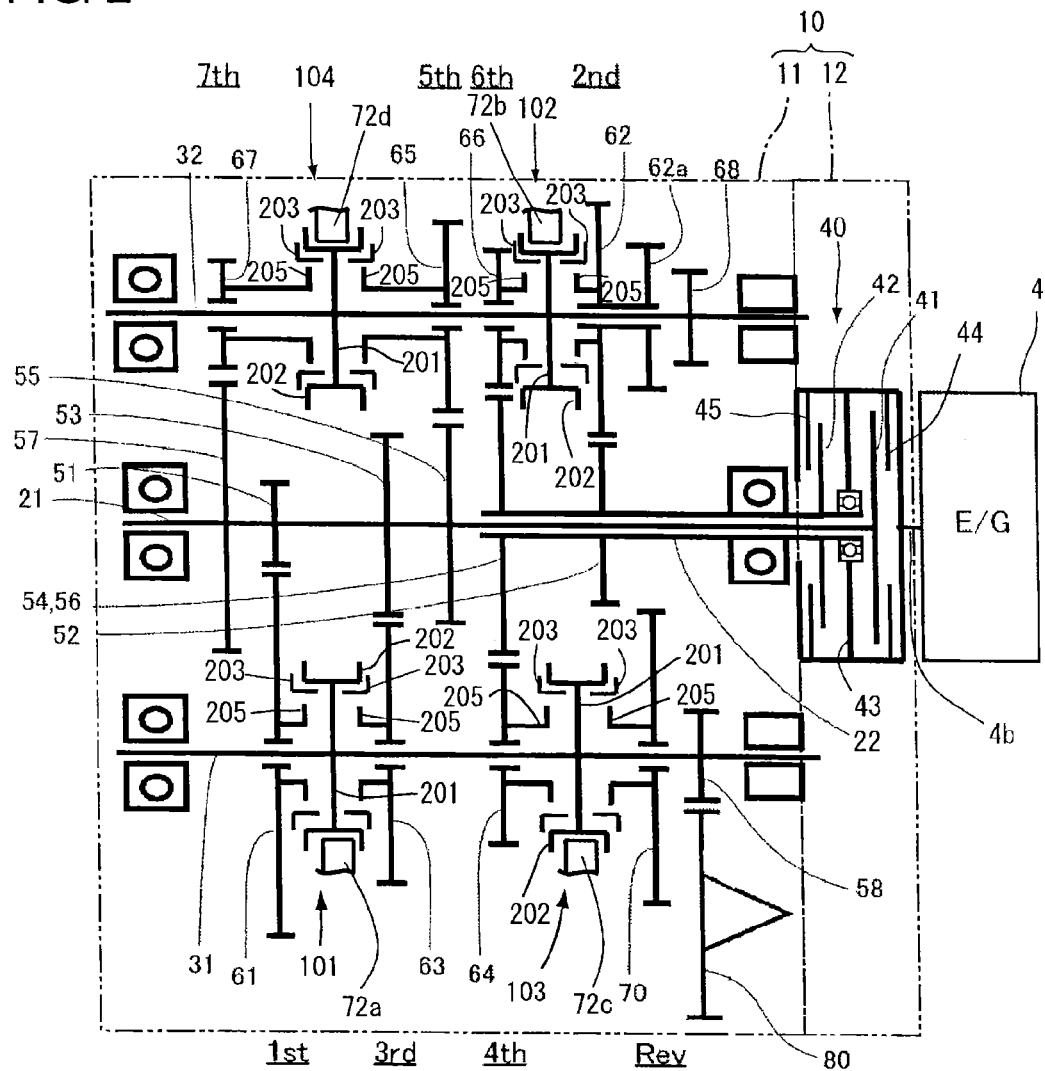
FIG. 2 is a skeletal illustration showing the structure of a gear change section of an automatic dual-clutch transmission controlled by the automatic clutch control device.

As shown in FIG. 2, the automatic dual clutch transmission 1 has a mission case 11 in which a plurality of gear stages are formed and received, and a clutch housing 12 containing a dual clutch 40 (corresponding to the dual clutch in the claimed invention). The mission case 11 and the clutch housing 12 constitute a case 10.

Further, the automatic clutch control device 20 controls the switching (gear changes) of a plurality of gear stages contained in the mission case 11 and the switching of a first clutch disc 41 (constituting the clutch and the first clutch in the claimed invention) and a second clutch disc 42 (constituting the clutch and the second clutch in the claimed invention) which are provided in the dual clutch 40 (corresponding to the clutch and the dual clutch in the claimed invention). The automatic clutch control device 20 is composed of the dual clutch 40, first and second clutch actuators 17, 28, an ECU (Engine Control Unit) 2, and a TCU (Transmission Control Unit) 3.

As shown in FIG. 1, the ECU 2 is connected to an output shaft rotational speed sensor 4a provided in the vicinity of a driving shaft 4b (output shaft) of the engine 4 for detecting the rotational speed (engine rotational speed Ne) of the driving shaft 4b of the engine 4 and is also connected to an electric motor (not shown) for opening/closing a throttle valve in a throttle body (both not shown), a throttle opening degree sensor (not shown) for detecting the opening degree of the throttle valve in the throttle body, an injector (not shown) for performing fuel injection which are provided in the engine 4, an accelerator opening degree sensor 27 provided on an accelerator pedal P (hereafter referred to as accelerator corresponding to the accelerator in the claimed invention), and the like. Thus, the ECU 2 executes the exchange of data with the respective devices and sends control commands to the respective devices. For example, based on the aforementioned information including the data obtained from the TCU 3, the ECU 2 controls the engine rotational speed Ne by driving the motor of the throttle body to control the opening degree of the throttle valve or by controlling the fuel injection amount of the injector and the like.

As shown in FIG. 1, the TCU 3 is connected to respective DC electric motors 19a, 19b respectively provided in first and second clutch actuators 17, 18 referred to later for performing the switching control of the dual clutch 40, stroke sensors 17a, 18a for detecting the moving strokes outputted by the respective DC motors 19a, 19b, vehicle speed sensors 23a, 23b, and first and second input shaft rotational speed sensors 24a, 24b. Further, the TCU 3 is connected to respective electric motors 131 of fork drive mechanisms 130 for respectively operating first to fourth shift clutches 101-104 referred to later, and shift stroke sensors 136-139 for respectively detecting the moving strokes of the first to fourth shift clutches 101-104 (refer to FIG. 3). Thus, the TCU 3 executes the exchange of data with the respective devices and sends control commands to the respective devices. The TCU 3 is connected to the ECU 2 and properly executes the gear change control of the automatic dual clutch transmission 1 while mutually exchanging information with the ECU 2 through a CAN communication (Controller Area Network).

As shown in FIG. 2, the automatic dual clutch transmission 1 is an automatic dual clutch transmission with seven speeds in a forward direction and is provided with a first input shaft 21, a second input shaft 22, a first secondary shaft 31 and a second secondary shaft 32 in the case 10 in the axial direction. Further, the case 10 is provided therein with the dual clutch 40, drive gears 51-57 of the respective gear stages, final reduction drive gears 58, 68, driven gears 61-67 of the respective gear stages, a reverse gear 70, and a ring gear 80. Hereinafter, the same direction as the direction in which the first input shaft 21, the second input shaft 22, the first secondary shaft 31 and the second secondary shaft 32 extend will be referred to as input shaft direction.

The first input shaft 21 is rotatably supported by bearings relative to the mission case 11 and the clutch housing 12. The outer circumferential surface of the first input shaft 21 is formed with portions supporting the bearings and a plurality of external splines. Further, a 1st speed drive gear 51 and a 3rd speed drive gear 53 constituting a plurality of odd number stage drive gears are formed directly on the first input shaft 21. Further, a 5th speed drive gear 55 and a 7th speed drive gear 57 also constituting the plurality of odd number stage drive gears are secured by press-fitting on the external splines formed on the outer circumferential surface of the first input shaft 21 through spline fittings. Further, the first input shaft 21 is formed on the outer circumferential surface at an end portion thereof with a coupling portion (spline) which is spline-fitted in a radially inner portion of the first clutch disc 41. Thus, the radially inner portion of the first clutch disc 41 is engaged with the coupling portion (spline) and is movable back and force on the first input shaft 21 in the input shaft direction.

The second input shaft 22 takes a hollow shaft shape, is rotatably supported on the outer circumference of a part of the first input shaft 21 through a plurality of bearings and is rotatably supported by bearings relative to the mission case 11 and the clutch housing 12. That is, the second input shaft 22 is arranged to be coaxially and relatively rotatable with respect to the first input shaft 21. Further, like the first input shaft 21, the second input shaft 22 is formed on the outer circumferential surface thereof with portions supporting bearings and a plurality of external gears. The second input shaft 22 is formed thereon with a 2nd speed drive gear 52, a 4th speed drive gear 54 and a 6th speed drive gear 56 being a plurality of even number stage drive gears. Further, the second input shaft 22 is formed on the outer circumferential surface at an end portion thereof with a coupling portion (spline) which is spline-fitted in a radially inner portion of the second clutch disc 42. Thus, the radially inner portion of the second clutch disc 42 is engaged with the coupling portion (spline) and is movable on the second input shaft 22 back and force in the input shaft direction.

The first secondary shaft 31 is rotatably supported by bearings relative to the mission case 11 and the clutch housing 12 and is arranged in the mission case 11 in parallel to the first input shaft 21. Further, on the outer circumferential surface thereof, the first secondary shaft 31 is formed with the final reduction drive gear 58, portions supporting the bearings, and a plurality of external splines. Furthermore, the first secondary shaft 31 is formed with support portions which freely rotatably support the 1st speed driven gear 61, the 3rd speed driven gear 63, the 4th speed driven gear 64, and the reverse gear 70.

Respective clutch hubs 201 of a first shift clutch 101 (corresponding to the first shift mechanism in the claimed invention) and a third shift clutch 103 (corresponding to the second shift mechanism in the claimed invention) are press-fitted on the external splines of the first secondary shaft 31 through spline fittings. The final reduction drive gear 58 meshes with the ring gear 80 of the differential gear device 14 shown in FIG. 1.

The 1st speed driven gear 61 supported to be freely rotatable on the support portion of the first secondary shaft 31 meshes with the 1st speed drive gear 51 formed on the first input shaft 21 and establishes a 1st speed gear stage (corresponding to the odd number gear change stages in the claimed invention). Thus, when the 1st speed driven gear 61 is selected by the TCU 3, the sleeve 202 of the first shift clutch 101 is moved toward the 1st speed driven gear 61 side and connects the 1st speed driven gear 61 and the first secondary shaft 31 not to be rotatable relatively. Thus, the 1st speed driven gear 61 and the first secondary shaft 31 turn to a state in which they are bodily rotated. This state will be referred to as a state that a 1st speed gear stage is established. Hereafter, the same will be true with respect to each of the 2nd to 7th speed gear stages and the reverse gear stage. At this time, the operation state of the first shift clutch 101 is observed by the shift stroke sensor 136 for the first shift clutch 101, and the state of the first shift clutch 101 is grasped by the TCU 3. Hereinafter, the same will be true with respect to each of the second to fourth shift clutches 104.

The 3rd speed driven gear 63 supported to be freely rotatable on the support portion of the first secondary shaft 31 meshes with the 3rd speed drive gear 53 formed on the first input shaft 21 and establishes a 3rd speed gear stage (also corresponding to the odd number gear change stages in the claimed invention). Thus, when the 3rd speed driven gear 63 is selected by the TCU 3, the sleeve 202 of the first shift clutch 101 is moved toward the 3rd speed driven gear 63 side and connects the 3rd speed driven gear 63 and the first secondary shaft 31 not to be rotatable relatively. Thus, the 3rd speed driven gear 63 and the first secondary shaft 31 turn to a state that they are bodily rotated (the established state of the 3rd speed gear stage).

The 4th speed driven gear 64 supported to be freely rotatable on the support portion of the first secondary shaft 31 meshes with the 4th speed drive gear 54 formed on the second input shaft 22 and establishes a 4th speed gear stage (corresponding to the even number gear change stages in the claimed invention). Thus, when the 4th speed driven gear 64 is selected by the TCU 3, a sleeve 202 of the third shift clutch 103 is moved toward the 4th speed driven gear 64 side and connects the 4th speed driven gear 64 and the first secondary shaft 31 not to be rotatable relatively. Thus, the 4th speed driven gear 64 and the first secondary shaft 31 turn to a state that they are bodily rotated (the established state of the 4th speed gear stage).

Furthermore, when the reverse gear 70 supported to be freely rotatable on the support portion of the first secondary shaft 31 is selected by the TCU 3, the sleeve 202 of the third shift clutch 103 is moved toward the reverse gear 70 side and connects the reverse gear 70 and the first secondary shaft 31 not to be rotatable relatively. Thus, the reverse 70 and the first secondary shaft 31 turn to a state that they are bodily rotated (the established state of the reverse gear stage). The reverse gear 70 always meshes with a small-diameter gear 62a which is bodily formed with a 2nd speed driven gear 62 being freely rotatably supported on the second secondary shaft 32.

The second secondary shaft 32 is rotatably supported by bearings relative to the mission case 11 and the clutch housing 12 and is arranged in the mission case 11 in parallel to the first input shaft 21. Further, like the first secondary shaft 31, on the outer circumferential surface thereof, the second secondary shaft 32 is formed with the final reduction gear 68 and is also formed with portions supporting the bearings, and a plurality of external splines. Respective clutch hubs 201 of a second shift clutch 102 (also corresponding to the second shift mechanism in the claimed invention) and a fourth shift clutch 104 (also corresponding to the first shift mechanism in the claimed invention) are press-fitted on the external splines of the second secondary shaft 32 through spline fittings. The final reduction drive gear 68 meshes with the ring gear 80 of the differential gear device 14. The ring gear 80 meshes with the final reduction drive gear 58 and the final reduction drive gear 68 and is always rotationally connected to the first secondary shaft 31 and the second secondary shaft 32. The ring gear 80 is rotationally connected to the driving shafts 15a, 15b and the driving wheels 16a, 16b through an output shaft (not shown) supported in the case 10 and the differential gear device 14. Furthermore, the second secondary shaft 32 is formed thereon with support portions that freely rotatably support the 2nd speed driven gear 62, the 5th speed driven 65, the 6th speed driven gear 66 and the 7th speed driven gear 67.

The 2nd speed driven gear 62 supported to be freely rotatable on the support portion of the second secondary shaft 32 meshes with the 2nd speed drive gear 52 formed on the second input shaft 22 and establishes the 2nd speed gear stage (corresponding to the even number gear change stages in the claimed invention). Thus, when the 2nd speed driven gear 62 is selected by the TCU 3, a sleeve 202 of the second shift clutch 102 is moved toward the 2nd speed driven gear 62 side and connects the 2nd speed driven gear 62 and the second secondary shaft 32 not to be rotatable relatively. Thus, the 2nd speed driven gear 62 and the second secondary shaft 32 turn to a state that they are bodily rotated (the established state of the 2nd speed gear stage).

The 5th speed driven gear 65 supported to be freely rotatable on the support portion of the second secondary shaft 32 meshes with the 5th speed drive gear 55 formed on the first input shaft 21 and establishes a 5th speed gear stage (also corresponding to the odd number gear change stages in the claimed invention). Thus, when the 5th speed driven gear 65 is selected by the TCU 3, a sleeve 202 of the fourth shift clutch 104 is moved toward the 5th speed driven gear 65 side and connects the 5th speed driven gear 65 and the second secondary shaft 32 not to be rotatable relatively. Thus, the 5th speed driven gear 65 and the second secondary shaft 32 turn to a state that they are bodily rotated (the established state of the 5th speed gear stage).

Further, the 6th speed driven gear 66 supported to be freely rotatable on the support portion of the second secondary shaft 32 meshes with the 6th speed drive gear 56 formed on the second input shaft 22 and establishes a 6th speed gear stage (also corresponding to the even number gear change stages in the claimed invention). Thus, when the 6th speed driven gear 66 is selected by the TCU 3, the sleeve 202 of the second shift clutch 102 is moved toward the 6th speed driven gear 66 side and connects the 6th speed driven gear 66 and the second secondary shaft 32 not to be rotatable relatively. Thus, the 6th speed driven gear 66 and the second secondary shaft 32 turn to a state that they are bodily rotated (the established state of the 6th speed gear stage).

The 7th speed driven gear 67 supported to be freely rotatable on the support portion of the second secondary shaft 32 meshes with the 7th speed drive gear 57 provided on the first input shaft 21 and establishes a 7th speed gear stage (also corresponding to the odd number gear change stages in the claimed invention). Thus, when the 7th speed driven gear 67 is selected by the TCU 3, the sleeve 202 of the fourth shift clutch 104 is moved toward the 7th speed driven gear 67 side and connects the 7th speed driven gear 67 and the second secondary shaft 32 not to be rotatably relatively. Thus, the 7th speed driven gear 67 and the second secondary shaft 32 turn to a state that they are bodily rotated (the established state of the 7th speed gear stage).

Next, the dual clutch 40 will be described with reference to FIGS. 1 and 2. Although the dual clutches 40 respectively shown in FIGS. 1 and 2 appear to differ in construction when compared, the dual clutch 40 shown in FIG. 2 is illustrated to be simpler than that shown in FIG. 1. Therefore, it is added that the dual clutches 40 shown in FIGS. 1 and 2 are identical.

The dual clutch 40 is provided coaxially with the first input shaft 21 and the second input shaft 22. The dual clutch 40 is housed in the clutch housing 12 on the right in FIG. 2 and, as shown in FIGS. 1 and 2, has the first and second clutch discs 41, 42, a center plate 43, first and second pressure plates 44, 45 and first and second diaphragm springs 46, 47 (refer to FIG. 1). The first clutch in the claimed invention is composed of the first clutch disc 41, the center plate 43, the first pressure plate 44 and the first diaphragm spring 46. Further, the second clutch in the claimed invention is composed of the second clutch disc 42, the center plate 43, the second pressure plate 45 and the second diaphragm spring 47.

The first clutch disc 41 is controlled by a clutch torque Tc to be engaged and transmits the clutch torque Tc to the first input shaft 21 through engagement with the center plate 43. The second clutch disc 42 is controlled by a clutch torque Tc to be engaged and transmits the clutch torque Tc to the second input shaft 22 through engagement with the center plate 43. The first clutch disc 41 is spline-engaged with the coupling portion of the first input shaft 21 slidably in the input shaft direction, and the second clutch disc 42 is spline-engaged with the coupling portion of the second input shaft 22 slidably in the input shaft direction.

As shown in FIGS. 1 and 2, the center plate 43 is arranged between the first clutch disc 41 and the second clutch disc 42 with opposite surfaces thereof facing the surfaces of the first and second clutches 41, 42 in parallel relation. The center plate 43 is provided rotatably relative to the second input shaft 22 through a ball bearing interposed between itself and the outer surface of the second input shaft 22 and is coupled to the driving shaft 4b of the engine 4 to be bodily rotatable.

As shown in FIGS. 1 and 2, the first and second pressure plates 44, 45 put the first and second clutch discs 41, 42 between the center plate 43 and themselves and are arranged to be pressure-contactable with the first and second clutch discs 41, 42.

The first and second diaphragm springs 46, 47 shown in FIG. 1 take the form of a disc. With respect to the center plate 43, the first diaphragm spring 46 is arranged on the side opposite to the first pressure plate 44 in the input shaft direction. The radially outer portion of the first diaphragm spring 46 and the first pressure plate 44 are connected by a cylindrical coupling potion 44a. Further, the first diaphragm spring 46 is supported on an end portion of an arm portion 43a extending from the center plate 43. In the state like this, as the radially outer portion of the first diaphragm spring 46 urges the coupling portion 44a toward the engine 4 side by a spring force acting toward the engine 4 side, the first pressure plate 44 is separated from the first clutch disc 41.

Further, when the radially inner portion of the first diaphragm spring 46 is pressed toward the engine 4 side, the spring force in the engine 4 direction of the radially outer portion of the first diaphragm spring 46 is attenuated. At the same time, the radially outer portion of the first diaphragm spring 46 is moved in a direction opposite to the engine 4 about the end portion acting as a fulcrum of the arm portion 43a extending from the center plate 43. Thus, the first pressure plate 44 is moved in the first clutch disc 41 direction and finally presses the first clutch disc 41 on the center plate 43 by sandwiching the first clutch disc 41 between itself and the center plate 43. Then, upon complete engagement, the clutch torque Tc being under control upon the engagement is transmitted to the first input shaft 21. In the above, the pressing force that presses the radially inner portion of the first diaphragm spring 46 is controlled by an actuator operating amount L1 in pressing the radially inner portion, the details of which will be described later.

Further, the second diaphragm spring 47 is arranged on the transmission side of the second pressure plate 45 and on the engine 4 side of the arm portion 43a of the center plate 43 and faces the second pressure plate 45. The radially outer portion of the second diaphragm spring 47 is arranged to make its spring force of the radially outer portion urge the arm portion 43a extending from the center plate 43 toward the transmission side. Thus, at an ordinary time, the second pressure plate 45 is not pressure-contacted on the second clutch disc 42. When the radially inner portion of the second diaphragm spring 47 is pressed toward the engine 4 side, a portion around the pressed portion is moved in the engine 4 direction about the radially outer portion acting as a fulcrum of the second diaphragm spring 47 contacting the arm portion 43a. Thus, the second pressure plate 45 is pressed by the diaphragm spring 47 to be moved in the second clutch disc 42 direction and finally presses the second clutch disc 42 on the center plate 43 by sandwiching the second clutch disc 42 therebetween. Then, upon complete engagement, the clutch torque Tc being under control upon the engagement is transmitted to the second input shaft 22. As is the same as the case of the first diaphragm spring 46, the pressing force that presses the radially inner portion of the second diaphragm spring 47 is controlled by an actuator operating amount L2 in pressing the radially inner portion.

The first and second clutch actuators 17, 18 (corresponding to the clutch actuator in the claimed invention) shown in FIG. 1 are controlled to press the radially inner portions of the aforementioned first and second diaphragm springs 46, 47. The first and second clutch actuators 17, 18 respectively have the DC electric motors 19a, 19b, rods 25a, 25b linearly moved by the operations of the DC electric motors 19a, 19b through ball-screw mechanisms, transmitting portions 26a, 26b that transmit the linear motions of the rods 25a, 25b to the respective radially inner portions of the first and second diaphragm springs 46, 47, and the stroke sensors 17a, 18a for detecting actuator operating amounts L1, L2 in the linear motions of the rods 25a, 25b. Further, information regarding the actuator operating amounts L1, L2 of the rods 25a, 25b detected by the stroke sensors 17a, 18a is transmitted to the TCU 3.

The dual clutch 40 is constructed like this, and when a gear change command is outputted from the TCU 3, a gear change control section 3c (referred to later in detail) of the TCU 3 operates the first clutch actuator 17 or the second clutch actuator 18 by the predetermined actuator operating amount L1, L2 toward the transmission side to control the clutch torque transmitted from the engine 4. Thus, the gear change control section 3c performs a disconnection control to disconnect the clutch of the first and second clutch discs 41, 42 which corresponds to the input shaft to be disconnected from the engine 4 of the first and second input shafts 21, 22.

Further, at the same time, the gear change control section 3c controls the clutch of the first and second clutch discs 41, 42 which corresponds to the input shaft to be connected to the engine 4 of the first and second input shafts 21, 22 so that the clutch torque Tc becomes a target clutch torque Tca which is calculated based on a current output torque Te which is presently being outputted by the engine 4, and a target rotational speed changing speed ΔNet demanded at the engine 4 (the details will be referred to later). Then, the gear change control section 3c performs an engaging control to make a connection when the engine rotational speed Ne of the engine 4 (corresponding to the prime mover rotational speed in the claimed invention and hereafter referred to as engine rotational speed) is synchronized with the input shaft rotational speed Ni of the input shaft to be connected. Specifically, the operation of the rod 25a or 25b by the DC motor 19a or 19b is controlled to press the radially inner portion of the first or second diaphragm spring 46 or 47 toward the engine 4 side.

Figure 3:
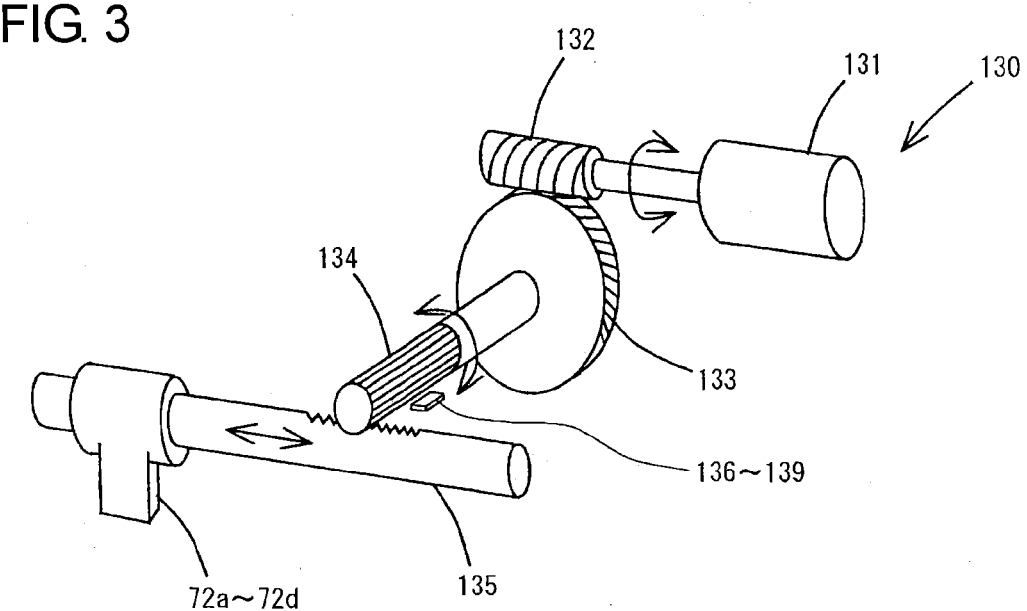
FIG. 3 is an illustration showing a drive mechanism for a fork in the transmission.
Figure 4:
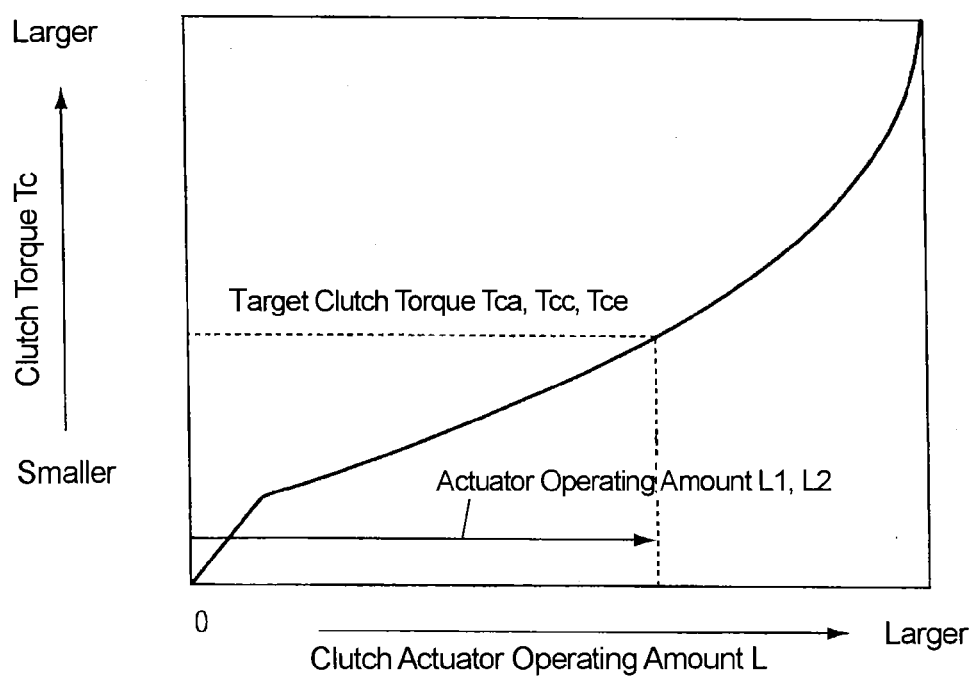
FIG. 4 is a graph showing a relationship between operation amounts of a clutch actuator and clutch torques.

Next, the first to fourth shift clutches 101-104 will be described with reference to FIGS. 2 and 3. Respective forks 72a, 72b, 72c, 72d shown in FIGS. 2 and 3 are the members that are engaged with the outer circumferential portions of the sleeves 202 provided in the first to fourth shift clutches 101-104 for sliding the sleeves 202 in the axial direction. The respective forks 72a-72d are driven by the respective fork drive mechanisms 130 typically shown in FIG. 3.

As the fork drive mechanisms 130, in the present embodiment, there are provided four mechanisms that respectively drive the first to fourth shift clutches 101-104. As typically shown in FIG. 3, each fork drive mechanism 130 is provided with the electric motor 131 having a warm gear 132 formed on a rotational shaft thereof, a warm wheel 133 meshing with the warm gear 132, a pinion gear 134 formed bodily with the warm wheel 133 in axial alignment, and a rack shaft 135 meshing with the pinion gear 134. The respective forks 72a-72d are bodily provided on respective rack shafts including the rack shaft 135. That is, when the motor 131 of each fork drive mechanism 130 is rotated, the fork 72a-72d connected to the motor 131 is slidden in the axial direction of the first or second secondary shaft 31, 32.

As shown in FIG. 3, the shift stroke sensors 136-139 for detecting the stroke amounts through which the forks 72a-72d slide and move in the axial direction are provided respectively in the vicinities of rotational shafts of the pinion gears 134. The shift stroke sensors 136-139 are connected to the TCU 3, and the rotational number of each warm wheel 133 is converted into the stroke amount in a calculation section of the TCU 3. Each of the shift stroke sensors 136-139 may be provided in the vicinity of the rotational shaft of each motor 131.

The first shift clutch 101 is arranged between the 1st speed driven gear 61 and the 3rd speed driven gear 63 in the axial direction of the first secondary shaft 31. The second shift clutch 102 is arranged between the 2nd speed driven gear 62 and the 6th speed driven gear 66 in the axial direction of the second secondary shaft 32. The third shift clutch 103 is arranged between the 4th speed driven gear 64 and the reverse gear 70 in the axial direction of the first secondary shaft 31. Further, the fourth shift clutch 104 is arranged between the 5th speed driven gear 65 and the 7th speed driven gear 67 in the axial direction of the second secondary shaft 32.

As shown in FIG. 2, the first shift clutch 101 is provided with the clutch hub 201, a 1st speed engaging member 205, a 3rd speed engaging member 205, synchronizer rings 203, and the sleeve 202. The clutch hub 201 is spline-fixed on the first secondary shaft 31. The 1st speed engaging member 205 is press-fitted and fixed on the 1st speed driven gear 61. The 3rd speed engaging member 205 is press-fitted and fixed on the 3rd speed driven gear 63. The synchronizer rings 203 are respectively interposed between the clutch hub 201 and the left and right engaging members 205. The sleeve 202 is spline-engaged with the outer circumference of the clutch hub 201 slidably in the axial direction. The first shift clutch 101 is a well-known synchromesh mechanism that connects the respective driven gears 61, 63 alternatively to the first secondary shaft 31.

The sleeve 202 of the first shift clutch 101 in the neutral position is engaged with neither of the engaging members 205. However, when the rack shaft 135 is driven in the input shaft direction by the operation of the fork drive mechanism 130 to shift the sleeve 202 toward the 1st speed driven gear 61 side by the fork 72a which is secured to the rack shaft 135 and is engaged with an annular groove on the outer circumference of the sleeve 202, the internal gear (not shown) of the sleeve 202 is spline-engaged with the synchronizer ring 203 on the 1st speed driven gear 61 side. Thus, the first secondary shaft 31 and the 1st speed driven gear 61 are synchronized in rotation as the synchronizer ring 203 is pressed on the 1st speed driven gear 61. Then, the internal gear of the sleeve 202 is spline-engaged with the external spline (both not shown) on the outer circumference of the 1st speed engaging member 205, whereby the first secondary shaft 31 and the 1st speed driven gear 61 are bodily connected to establish the 1st speed gear stage. On the other hand, when the fork 72a is operated by the fork drive mechanism 130 to shift the sleeve 202 toward the 3rd speed driven gear 63 side, the first secondary shaft 31 and the 3rd speed driven gear 63 are likewise synchronized in rotation, after which the both members are bodily connected to establish the 3rd speed gear stage.

Each of the second to fourth shift clutches 102-104 is substantially the same as the first shift clutch 101 in construction and differs therefrom in the mounting position only. The second shift clutch 102 selectively connects the 2nd speed driven gear 62 and the 6th speed driven gear 66 to the second secondary shaft 32 not to allow relative rotation therebetween and selectively establishes the 2nd speed gear stage and the 6th speed gear stage. The third shift clutch 103 selectively connects the 4th speed driven gear 64 and the reverse gear 70 to the first secondary shaft 31 not to allow relative rotation therebetween and selectively establishes the 4th speed gear stage and the reverse gear stage. Further, the fourth shift clutch 104 selectively connects the 5th speed driven gear 65 and the 7th speed driven gear 67 to the second secondary shaft 32 not to allow relative rotation therebetween and selectively establishes the 5th speed gear stage and the 7th speed gear stage.

Next, the ECU 2 will be described. As shown in FIG. 1, the ECU 2 has an accelerator pressing-down speed detecting section 2a, an accelerator pressing-down amount detecting section 2b and a prime mover rotational speed detecting section 2c.

The accelerator pressing-down speed detecting section 2a includes an accelerator opening degree sensor 27 and detects a pressing-down speed Vac of the accelerator pressed down by the driver. Specifically, it derives the pressing-down speed Lac by differentiating accelerator opening degree data obtained from the accelerator opening degree sensor 27.

The accelerator pressing-down amount detecting section 2b includes the accelerator opening degree sensor 27 and detects a pressing-down amount Lac of the accelerator pressed down by the driver. Specifically, it detects as the pressing-down amount Lac an accelerator opening degree obtained from the accelerator opening degree sensor 27.

The prime mover rotational speed detecting section 2c includes a driving shaft rotational speed sensor 4a which is provided in the vicinity of the driving shaft 4b of the engine 4, and detects an engine rotational speed Ne by the driving shaft rotational speed sensor 4a.

As mentioned previously, the TCU 3 includes a shift clutch control section (not shown) that controls the fork drive mechanisms 130 for operating the first to fourth shift clutches 101-104. Further, the TCU 3 includes the aforementioned gear change control section 3c, and when a gear change command is given, the gear change control section 3c controls one being in connection of the first clutch disc 41 and the second clutch disc 42 to be disconnected and controls the other thereof to be engaged (connection control). Specifically, when there is sent out a gear change command for an upward gear change in which the shifting is made toward a gear change stage which is smaller in gear change ratio such as from the 2nd speed gear stage to the 3rd speed gear stage, the gear change control is carried out as follows:

First of all, the gear change control section 3c performs a disconnection control to disconnect the second clutch disc 42 which is in connection to the second input shaft 22 with the 2nd speed drive gear 52 fixed thereon. At the same time, the gear change control section 3c performs an engaging control to connect the first clutch disc 41 that is connected to the first input shaft 21 on which the 3rd speed drive gear 63 being already established is fixed. At this time, in the course of the connection of the first clutch disc 41, a synchronization control is carried out to synchronize the engine rotational speed Ne with the rotational speed Ni1 of the first input shaft to be connected. At this time, the engine rotational speed Ne is detected by the prime mover rotational speed detecting section 2c, and the first input shaft rotational speed Ni1 is detected an input shaft rotational speed detecting section 3d referred to later. Then, when the engine rotational speed Ne is synchronized with the first input shaft rotational speed Ni1, the clutch actuator operating amount L1 of the first clutch actuator 17 is operated to a maximum amount L1 max to bring the first clutch disc 41 into a complete connection.

Here, assuming that in the aforementioned upward gear change, the vehicle speed before and after the gear change remains to be fixed, the gear change ratio has become smaller. Thus, the first input shaft rotational speed Ni1 is lower than the second input shaft rotational speed Ni2, and this results in lowering the engine rotational speed Ne after the gear change than that before the gear change. For this reason, merely switching the engaging states of the first clutch disc 41 and the second clutch disc 42 would raise an anxiety about an increase in the load on the clutch or the generation of a gear change shock. To avoid this, as described above, before performing the connection control of the first clutch disc 41, the gear change control section 3c performs the synchronization control to decelerate the engine rotational speed Ne and to synchronize the same with the first input shaft rotational speed Ni1, thereby mitigating the gear change shock and stabilizing the engine rotational speed Ne after the gear change.

Further, assuming that in a downward gear change such as, for example, from the 3rd speed gear stage to the 2nd speed gear stage, the vehicle speed before and after the gear change remains to be fixed, the gear change ratio has become larger. Thus, the second input shaft rotational speed Ni2 is higher than the first input shaft rotational speed Ni1, and this results in increasing the engine rotational speed Ne after the gear change than that before the gear change. For this reason, merely switching the engaging states of the first clutch disc 41 and the second clutch disc 42 would raise an anxiety about an increase in the load on the clutch or the generation of a gear change shock. To avoid this, before performing the engaging control of the second clutch disc 42, the gear change control section 3c performs a synchronization control to accelerate the engine rotational speed Ne and to synchronize the same with the second input shaft rotational speed Ni2, thereby mitigating the gear change shock and stabilizing the engine rotational speed Ne after the gear change.

As shown in FIG. 1, the TCU 3 is provided with a target clutch torque calculation section 3a, a clutch actuator operating amount calculation section 3b, the aforementioned gear change control section 3c, an input shaft rotational speed detecting section 3d, a pressing-down speed threshold value judging section 3e, a prime mover rotational speed increasing control section 3f, and a target clutch torque change calculation section 3g.

The clutch actuator operating amount calculation section 3b calculates the target clutch torque Tca having been described before. The target clutch torque Tca is calculated by Expression 1 noted below. The target clutch torque Tca is a reference transmission torque that enables a gear change with the gear change shock suppressed where the clutch on the higher speed gear stage side is controlled by the torque after the disconnection control of the clutch on the lower speed gear stage side, or where the clutch on the lower speed gear stage side is controlled by the torque after a disconnection control of the clutch on the higher speed gear stage side in downshifting.

$$Tca = Te - Ie \cdot \Delta Net \quad \text{[Expression 1]}$$

Tca: Target clutch torque
Te: Current output torque of Engine
Ie: Inertia
ΔNet: Target rotational speed changing speed To this end, first of all, a target inertial torque Ie·ΔNet for the clutch on the higher speed gear stage side or the clutch on the lower speed gear stage side is calculated by multiplying a target rotational speed changing speed ΔNet of the engine 4 (corresponding to the target rotational speed changing speed in the claimed invention) with the inertia Ie of the engine 4 (called "inertial moment" or "moment of inertia"). This "target inertial torque Ie·ΔNet" corresponds to a deceleration torque or an acceleration torque that should be transmitted from the first and second clutch discs 41, 42 to the driving shaft 4b of the engine 4 in order to change (decelerate or accelerate) the engine rotational speed Ne preferably. In the expression, the target inertia torque Ie·ΔNet takes a negative value when the engine rotational speed Ne is decelerated and takes a positive value when the engine rotational speed Ne is accelerated.

The target rotational speed changing speed ΔNet is a value that is predetermined as a target value for the changing speed of the engine rotational speed Ne in the up gear change control (upshift) or the down gear change control (downshift). That is, when in the up gear change control or the down gear change control, the target rotational speed changing speed ΔNet is controlled to make the changing speed of the engine rotational speed Ne become the target rotational speed changing speed ΔNet, the gear change can be completed quickly while suppressing the gear change shock.

Then, the target clutch torque Tca is calculated by subtracting the target inertia torque Ie·ΔNet from the current output torque Te which is presently being outputted by the engine 4. The "current output torque Te being presently" of the engine 4 can be calculated based on a detection value such as, for example, the engine rotational speed Ne detected by the prime mover rotational speed detecting section 2c or the accelerator opening degree of the accelerator P detected by the accelerator pressing-down amount detecting section 2b.

The clutch actuator operating amount calculation section 3b calculates clutch actuator operating amounts L1, L2 for the first and second clutch actuators 17, 18 to obtain the target clutch torque Tca. The correspondence relation between the clutch actuator operating amount L and the clutch torque Tc is obtained in advance and is stored in, for example, a ROM (refer to FIG. 4). Thus, the clutch actuator operating amount calculation section 3b derives from the table shown in FIG. 4 the clutch actuator operating amounts L1, L2 for the first and second clutch actuators 17, 18 that correspond to the calculated target clutch torque Tca.

When the gear change command is sent out as mentioned previously, the gear change control section 3c performs a disconnection control to disconnect the clutch disc of the first and second clutch discs 41, 42 that corresponds to the input shaft to be disconnected from the engine 4 of the first and second input shafts 21, 22. Further, at the same time, the gear change control section 3c performs an engaging control to synchronize the engine rotational speed Ne with the input shaft rotational speed Ni of the input shaft to be connected and to make an engagement therebetween by controlling the clutch disc of the first and second clutch discs 41, 42 that corresponds to the input shaft to be connected to the engine 4 of the first and second input shafts 21, 22.

The input shaft rotational speed detecting section 3d includes the first input shaft rotational speed sensor 24a provided in the vicinity of the first input shaft 21 and the second input shaft rotational speed sensor 24b provided in the vicinity of the second input shaft 22 and detects input shaft rotational speeds Ni1, Ni2 of the first and second input shafts 21, 22.

When a gear change command is sent out for a downshift from a higher speed gear stage side to a lower speed gear stage side, the pressing-down speed threshold value judging section 3e judges whether or not the accelerator pressing-down speed Vac detected by the accelerator pressing-down speed detecting section 2a provided in the ECU 2 exceeds a predetermined pressing-down speed threshold valve A indicated in FIG. 6(c). In this case, the magnitude of the pressing-down speed threshold valve A may be set in various manners and may be determined to a suitable value based on an advance evaluation.

When the accelerator pressing-down speed Vac exceeds the predetermined pressing-down speed threshold valve A, the prime mover rotational speed increasing control section 3f first makes the gear change control section 3c disconnect, under the disconnection control, the clutch disc of the first and second clutch discs 41, 42 that corresponds to the input shaft to be disconnected from the engine 4 of the first and second input shafts 21, 22. Then, the prime mover rotational speed increasing control section 3f performs a control to increase the engine rotational speed Ne so that the same comes into agreement with the input shaft rotational speed Ni of the input shaft to be next connected whose speed has been increased by the gear change stage on the lower speed gear stage side beyond the rotational speed Ni before the gear change of the disconnected input shaft. At this time, the gear change stage on the lower speed gear stage side has been established in response to the gear change command for the down shift. Thus, the synchronization between the engine rotational speed Ne of the engine 4 and the input shaft rotational speed Ni in the engaging process becomes easy to enable the clutch engagement in a short period of time. In the aforementioned increase control of the engine rotational speed Ne, the prime mover rotational speed detecting section 2c obtains data from the driving shaft rotational sensor 4b of the engine 4, so that a desired engine rotational speed Ne can be realized by suitably controlling a throttle valve opening degree, a fuel injection quantity or the like based on the data from the prime mover rotational speed detecting section 2c. In the present embodiment, where the accelerator pressing-down speed Vac does not exceed the predetermined pressing-down speed threshold valve A, the prime mover rotational speed increasing control section 3f does not perform the increase control of the engine rotational speed Ne.

The target clutch torque change calculation section 3g changes the target clutch torque Tca in dependence on the magnitude of the accelerator pressing-down speed Vac detected by the accelerator pressing-down speed detecting section 2a. That is, the accelerator pressing-down speed Vac is considered to indicate a demand of the driver in traveling. If the accelerator pressing-down speed Vac is larger than the pressing-down speed threshold valve A, the driver is judged to be demanding a larger acceleration, so that the target clutch torque is changed to become a target clutch torque Tce which is larger than the target clutch torque Tca calculated by the target clutch torque calculation section 3a. In the present embodiment, the target clutch torque Tce after being changed is set to become larger proportionally in the range beyond the pressing-down speed threshold valve A (refer to FIG. 5). However, the target clutch torque Tce to be controlled is not set linearly like this, but may be controlled to be a constant target clutch torque Tcg in the range exceeding the pressing-down speed threshold valve A (refer to two-dot-chain line in FIG. 5). Then, the gear change control section 3c controls the clutch disc to be then engaged of the first and second clutch discs 41, 42 based on the changed target clutch torque Tce and strongly presses the clutch disc on the center plate 43 to synchronize and engage the both members in a short period of time. As a result, the speed change gear stage can be switched quickly from the higher speed gear stage to the lower speed gear stage, so that the vehicle is made to travel powerfully by a large torque, thereby satisfying the driver's demand.

Further, If the accelerator pressing-down speed Vac is smaller than the pressing-down speed threshold valve A, the driver is judged not to be demanding a larger acceleration. Thus, the clutch torque Tc is held to remain as the target clutch torque Tca which is calculated by the target clutch torque calculation section 3a (refer to FIG. 5). Without being limited to this mode, if the accelerator pressing-down speed Vac is smaller than the pressing-down speed threshold valve A in any other case, the target clutch torque may be set as a target clutch torque Tcc which becomes smaller in dependence on (in proportion to) the difference between the accelerator pressing-down speed Vac and the pressing-down speed threshold valve A (refer to the broken line in FIG. 5). Then, the target clutch torque change calculation section 3g changes the target clutch torque Tca to the target clutch torque Tcc.

Then, of the first and second clutch discs 41, 42, the clutch disc to be connected this time is gently pressed on the center plate 43 by the target clutch torque Tca (or Tcc) under the control of the gear change control section 3c and is synchronized and engaged therewith. As a result, it is possible to realize a gradual or gentle acceleration meeting the driver's demand and a gear change in which the shock caused the connection of the clutch is mitigated.

Next, with reference to a time chart shown in FIG. 6 and a flow chart shown in FIG. 7, description will be made regarding the gear change control method and the operation of the automatic clutch control device 20, which is provided for the automatic dual clutch transmission 1 in the first embodiment, during the traveling of the vehicle.

It is now assumed in the first embodiment that for example, the vehicle is traveling at a fixed speed with the first clutch disc 41 held in the connection state and hence, with the first input shaft 21 and the engine 4 being in connection. At this time, the vehicle is traveling at the 3rd speed gear stage having been established on the first input shaft 21. Then, description will be made on the assumption that the driver with a desire for acceleration presses down on the accelerator P at a predetermined accelerator pressing-down speed Vac and that the accelerator opening degree and the vehicle speed V cross a gear shift line (not shown) for the 2nd speed gear stage whereby a gear change demand for the 2nd speed gear stage is sent out from the TCU 3.

Figure 6:
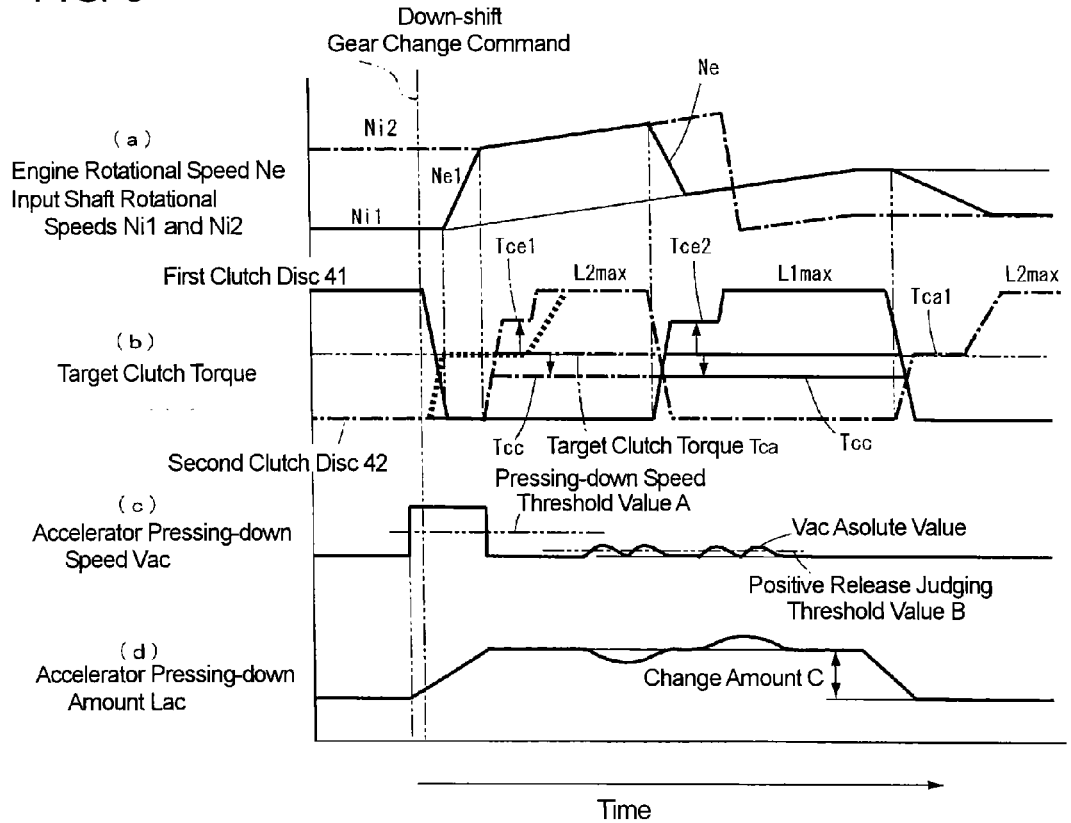
FIG. 6 is a chart for explaining the states of various parts under the control by the automatic clutch control device.
Figure 7:
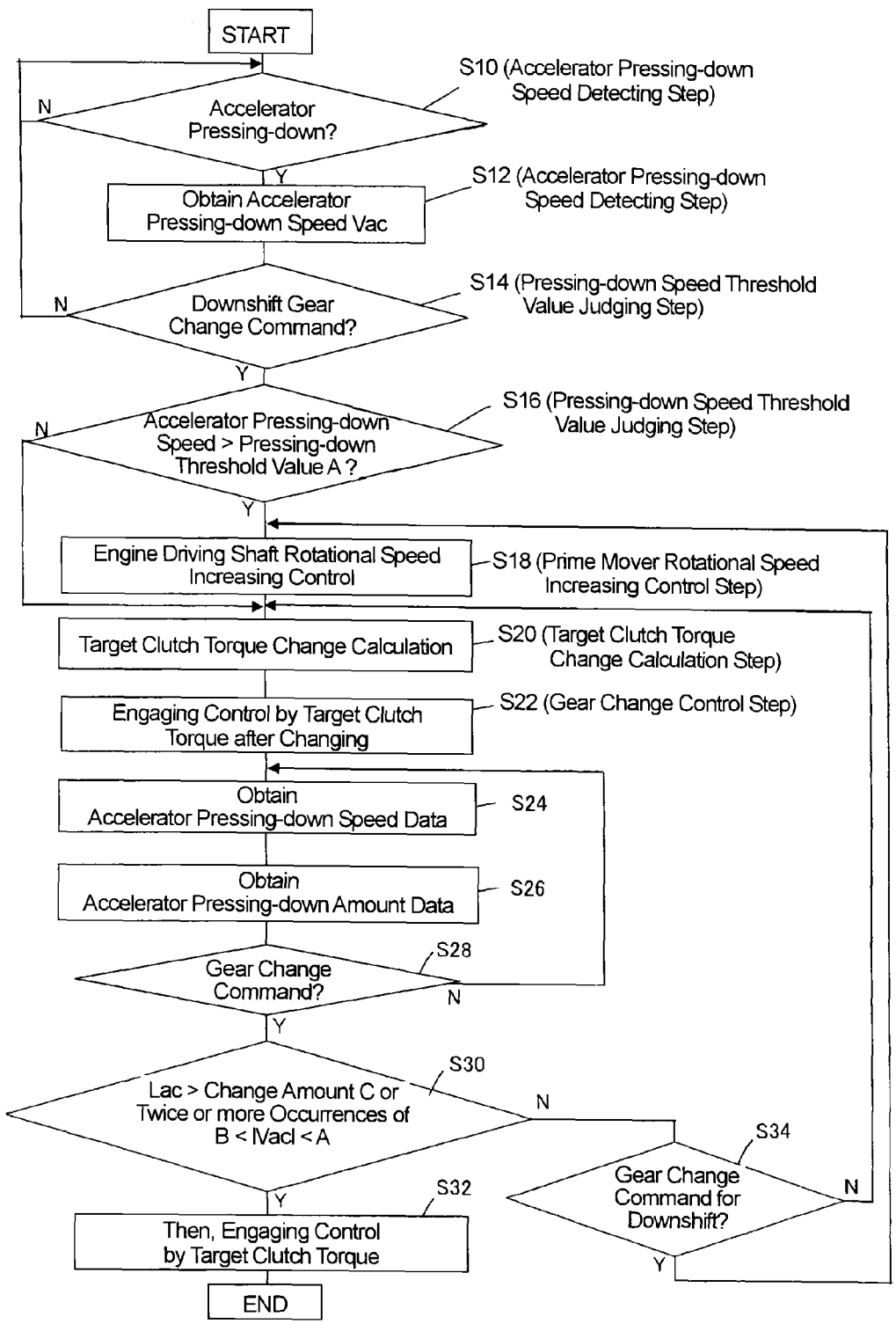
FIG. 7 is a flow chart of operations performed by the automatic clutch control device.

As shown by the flow chart in FIG. 7, at step S10 (accelerator pressing-down speed detecting step), the existence or nonexistence of the pressing-down shown in (c) and (d) of FIG. 6 of the accelerator P is detected by the accelerator pressing-down speed detecting section 2a. In the present embodiment, because the pressing-down exists, step S12 is reached. Unless the pressing-down exists, step S10 is repetitively processed.

At step S12 (accelerator pressing-down speed detecting step), the accelerator pressing-down speed Vac is calculated and obtained from the data detected by the accelerator pressing-down speed detecting section 2a.

At step S14 (pressing-down speed threshold value judging step), it is judged whether or not a gear change demand for downshift is sent out from the TCU 3 (refer to FIG. 6). In the present embodiment, the gear change command for the 2nd speed gear stage has been sent out, movement is made to step S16. Unless it has been sent out, processing of steps S10-S14 is repeated until it is sent out.

At step S16 (pressing-down speed threshold value judging step), it is judged whether or not the accelerator pressing-down speed Vac obtained by the pressing-down speed threshold value judging section 3e at step S12 exceeds the predetermined pressing-down speed threshold value A. If the predetermined pressing-down speed threshold value A is exceeded, movement is made to step S18. If it is not exceeded, movement is made to step S20.

A step S18 (prime mover rotational speed increasing control step), the prime mover rotational speed increasing control section 3f makes the gear change control section 3c disconnect the first clutch disc 41 by the disconnection control (refer to FIG. 6(b)). Thereafter, as mentioned before, the engine rotational speed Ne is controlled to be increased to become equal to the second input shaft rotational speed Ni2 of the second input shaft 22 which has been increased by the second gear stage, having been established on the second input shaft 22 in response to the gear change command for downshift, beyond the rotational speed Ni1 before the gear change of the disconnected first input shaft 21 (refer to Ne1 in FIG. 6(a)). At this time, the engine rotational speed Ne is observed by the prime mover rotational speed detecting section 2c, and the second input shaft rotational speed Ni2 is controlled while being observed by the input shaft rotational speed detecting section 3d.

Figure 5:
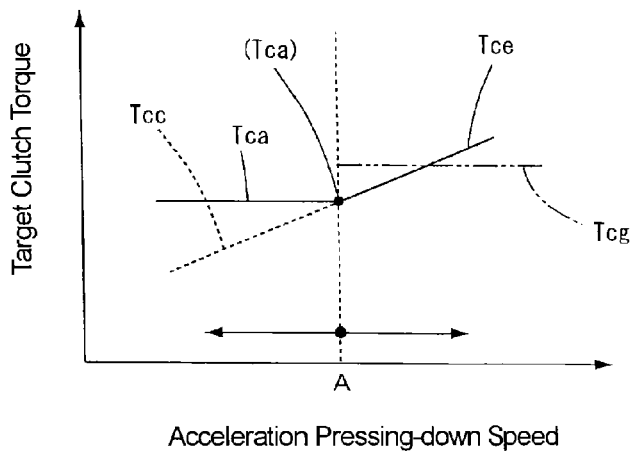
FIG. 5 is a graph showing target clutch torques set in dependence on pressing-down speeds of an accelerator.

At step S20 (target clutch torque change calculation step), the target clutch torque change calculation section 3g calculates and changes as the target clutch toque Tce a target clutch torque in dependence on the magnitude of the accelerator pressing-down speed Vac detected by the accelerator pressing-down speed detecting section 2a (refer to FIG. 5 and to Tce1 in FIG. 6(b)). Then, there reaches step S22 (gear change control step), and the gear change control section 3c controls the second clutch disc 42 based on the target clutch toque Tce so changed, to press the second clutch disc 42 on the center plate 43. Thus, the engine 4 whose engine rotational speed Ne has been almost equalized to the input shaft rotational speed Ni2 of the second input shaft 2, and the second input shaft 2 are synchronized in a short period of time. Then, after the input shaft rotational speed Ni2 and the engine rotational speed Ne are completely synchronized, the gear change control section 3c controls the second clutch actuator 18 so that the same is operated to make the clutch actuator operating amount L2 become the maximum amount L2max as shown in FIG. 6(b), to engage the second clutch disc 42. In this manner, it is possible to make a quick switching to a lower speed gear stage side without suffering a large gear change shock and to make the vehicle accelerate and travel powerfully by a large torque, so that the driver's demand can be satisfied.

Also at step S20 (target clutch torque change calculation step), if the accelerator pressing-down speed Vac is smaller than the pressing-down speed threshold value A, the driver is judged not to be desiring a large acceleration. Thus, the target clutch torque is set to become the target clutch torque Tca calculated by the target clutch torque calculation section 3a. Then, step S22 (gear change control step) is reached, and the gear change control section 3c performs a disconnection control to disconnect the first clutch disc 41 and at the same time, controls the second clutch disc 42 based on the ordinary target clutch torque Tca as indicated by the broken line in FIG. 6(b) and presses the second clutch disc 42 on the center plate 43 gently to synchronize both of them. Further, after the input shaft rotational speed Ni2 and the engine rotational speed Ne are completely synchronized thereafter, the gear change control section 3c controls the second clutch actuator 18 so that the same is operated to make the clutch actuator operating amount L2 become the maximum amount L2max as shown in FIG. 6(b), to engage the second clutch disc 42. Thus, it is possible to realize a gradual acceleration being smaller in shock and meeting the operator's demand. At step S20, as mentioned before, a change may be made to the target clutch torque Tcc being smaller than the target clutch torque Tca (refer to Tcc in FIG. 6(b)).

Step S24 and those subsequent thereto are for judging whether to continue or release the prime mover rotational speed increasing control at step S18 and the target clutch torque change calculation control at step S20, for the vehicle continuing to travel after completion of the gear change to the 2nd speed gear stage. At steps S24 and S26, the accelerator pressing-down speed detecting section 2a and the accelerator pressing-down amount detecting section 2b continue to obtain the accelerator pressing-down speed Vac data and the accelerator pressing-down amount Lac data until the next gear change command is transmitted at step S28. Then, when the transmission of the gear change command is confirmed at step S28, step S30 is reached.

At step S30, it is judged whether or not data indicative of the absolute value of the accelerator pressing-down speed Vac obtained at step S24 has entered at least twice the range which is less than the predetermined pressing-down speed threshold value A indicated in FIG. 6(c) and greater than a release judging threshold value B which is a newly set positive value being smaller than the pressing-down speed threshold value A (refer to FIG. 6(c)), or whether or not the accelerator pressing-down amount Lac data obtained at step S26 has changed more than a predetermined change amount C (refer to FIG. 6(d)). The release judging threshold value B and the change amount C are values obtained through advance experiments or the like.

Here, the fact that the absolute value of the accelerator pressing-down speed Vac has entered at least twice the range between the pressing-down speed threshold value A and the release judging threshold value B being a positive value means that as noted from the accelerator pressing-down amount Lac shown in FIG. 6(d), the accelerator P is operated to be slowly released once, then pressed down and returned to the same position or to be gently pressed down once and then returned to the same position. That is, considering the twice operations through the accelerator pressing-down amount Lac shown in FIG. 6(d) in correspondence with the changes of the accelerator pressing-down speed Vac shown in FIG. 6(c), the absolute value of the accelerator pressing-down speed Vac enters the range between the pressing-down speed threshold value A and the positive release judging threshold value B twice in each operation through the accelerator pressing-down amount Lac. From the fact that the accelerator P is pressed down or released from being pressed down within such a predetermined range, it is possible to judge that the driver is no longer desiring a large gear change. Needless to say, the number of times through which the accelerator pressing-down speed Vac enters the range between the pressing-down speed threshold value A and the positive release judging threshold value B is not limited to two times but may be any number of times.

Further, regarding the accelerator pressing-down amount Lac, if the accelerator pressing-down speed Vac is larger than the pressing-down speed threshold value A, the state that the amount Lac has changed (decreased) beyond the predetermined change amount C (refer to FIG. 6(d)) is regarded as the state that the judgment criteria is satisfied. That is, this is because if the accelerator pressing-down amount Lac becomes greater than the predetermined change amount C, the driver can be judged not to be desiring a large gear change any longer.

Further, if the accelerator pressing-down speed Vac is smaller than the pressing-down speed threshold value A and if the control is being executed by the target clutch torque Tcc, the state that the amount Lac has changed (the pressing-down has been effected) beyond the predetermined change amount C is regarded as the state that the judgment criteria is satisfied (not shown). That is, this is because if the accelerator P has been pressed down with the accelerator pressing-down amount Lac exceeding the predetermined change amount C, the driver can be judged not to be desiring a large gear change any longer. If at step 30, the accelerator pressing-down speed Vac is smaller than the pressing-down speed threshold value A and if the control is being executed by the ordinary target clutch torque Tca, the processing moves to step S32.

Thus, if either one of the judgment conditions is satisfied, step S32 is then reached based on the judgment that the driver is desiring an ordinary gear change. Thereafter, the controls by the prime mover rotational speed increasing control section 3f and the target clutch torque change calculation section 3g are released, and at the time of a gear change, the engaging control is performed by the ordinary target clutch torque Tca (refer to Tca1 in FIG. 6(b)). If neither judgment condition is satisfied, step S34 is reached.

At step S34, a judgment is made of whether or not the gear change command judged to have sent out at step S28 is that for downshift. If it is for downshift, step S18 is reached to make the gear change control section 3c disconnect the second clutch disc 42, as already described at step S18 (refer FIG. 6(b)). Then, the engine rotational speed Ne (Ne1 is controlled to increase and become equal to the first input shaft rotational speed Ni1 of the first input shaft 21 which has been increased by the 1st speed gear stage, having been established on the first input shaft 21 in response to the gear change command for downshift, beyond the second input shaft rotational speed Ni2 before the gear change of the disconnected second input shaft 22.

Thereafter, at step S20, the target clutch torque change calculation section 3g continuously calculates the target clutch torque Tce based on the accelerator pressing-down speed Vac obtained at step S12, and the gear change control section 3c performs the engaging control by the target clutch torque Tce so changed. Then, after the rotational speed Ni1 of the first input shaft 21 and the engine rotational speed Ne are synchronized completely, the gear change control section 3c controls the first clutch actuator 17 to operate so that the clutch actuator operating amount L1 becomes the maximum amount L1 max, to engage the first clutch disc 41. In this manner, it is possible to make a quick switching to a lower speed gear stage side without suffering a large gear change shock and to make the vehicle accelerate and travel powerfully by a large torque, so that the driver's demand can be satisfied. Thereafter, the control according to the present invention is continued until step S32 is reached as a result of the predetermined condition satisfied at step S30.

Further, if at step S34, the gear change command is judged to be that for upshift, the first input shaft 21 to be connected next is lower in rotational speed than the engine rotational speed Ne at the time of the gear change, and hence, the control to increase the engine rotational speed Ne is not needed. Thus, step S20 is reached to calculate the target clutch torque Tce based on the accelerator pressing-down speed Vac obtained at step S12, and the gear change control section 3c performs the engaging control by the changed target clutch torque Tce (refer to Tce2 in FIG. 6(b)). Then, after the input shaft rotational speed Ni1 of the first input shaft 21 and the engine rotational speed Ne are synchronized completely, the gear change control section 3c controls the first clutch actuator 17 to operate so that the clutch actuator operating amount L1 becomes the maximum amount L1 max as shown in FIG. 6(b), to engage the first clutch disc 41. Therefore, it is possible to make a quick switching to a higher speed gear stage (3rd speed gear stage) side without suffering a large gear change shock and to make the vehicle travel acceleratedly, so that the driver's demand can be satisfied. Thereafter, like the case of the downshift, the control according to the present invention is continued until step S32 is reached as a result of the predetermined condition satisfied at step S30.

In the foregoing embodiment, description has been made on the assumption that the vehicle is traveling at the 3rd speed gear stage established on the first input shaft 21 and that then, the gear change command for the 2nd speed gear stage is sent out from the TCU 3. However, without being limited to this mode, there may be another mode in which when the driver presses down on the accelerator P at a predetermined accelerator pressing-down speed Vac, a gear shift line for the 1st speed gear stage is crossed with a result that a gear change command from the 3rd speed gear stage to the 1st speed gear stage is sent out from the TCU 3. In this case, at step S18 (prime mover rotational speed increasing control step), the prime mover rotational speed increasing control section 3f first makes the gear change control section 3c disconnect the first clutch disc 41 by the disconnection control. Thereafter, a control may be performed in which the engine rotational speed Ne is increased to become equal to the first input shaft rotational speed Ni1 of the first input shaft 21 being the same input shaft which has been increased by the 1st speed gear stage beyond the first input shaft rotational speed Ni1 before the gear change of the disconnected first input shaft 21. The 1st speed gear stage at this time has been established on the first input shaft 21 which had been been disconnected in response to the gear change command for downshift.

Then, at step S20 (target clutch torque change calculation step), the target clutch torque change calculation section 3g changes the target clutch toque Tca in dependence on the accelerator pressing-down speed Vac detected by the accelerator pressing-down speed detecting section 2a. Then, step S22 (gear change control step) is reached, and the gear change control section 3c controls the first clutch disc 41 based on the target clutch toque Tce so changed, to press the first clutch disc 41 on the center plate 43. Then, the engine 4, whose engine rotational speed Ne has been almost equalized to the input shaft rotational speed Ni1 of the first input shaft 21, and the first input shaft 21 are synchronized and connected in a short period of time. As a result, like the foregoing, it is possible to make a quick switching from a higher speed gear stage to a lower speed gear stage side being lower by two stages without suffering a large gear change shock and to make the vehicle accelerate and travel powerfully by a large torque, so that the driver's demand can be satisfied.

Further, although the aforementioned flow chart has been described as the control from step S10 to step S34, it is not limited to this control mode and may be a control mode including steps S10 to step S20 only. Suitable effects can be realized in this modified mode of control.

Further, for step S30, a modification is made, in which step S34 is reached if a predetermined time elapses with the accelerator pressing-down speed Vac data being less than the predetermined pressing-down speed threshold value A. Like this modified mode, any setting can be made so far as a barometer is taken to indicate that the driver's will for acceleration has been changed.

As apparent from the foregoing description, in the automatic clutch control device 20 in the first embodiment, if a gear change command for downshift is outputted with a result that the accelerator pressing-down speed Vac is detected to have exceeded the predetermined pressing-down speed threshold value A, first of all, the disconnection control is performed to disconnect the clutch of the first and second clutch discs 41, 42 which corresponds to the input shaft to be disconnected from the engine 4 of the first and second input shafts 21, 22.

Thereafter, the prime mover rotational speed increasing control section 3f controls the engine rotational speed Ne of the engine 4 to become equal to the input shaft rotational speed Ni1 or Ni2 of the input shaft of the first and second input shafts 21, 22 which is to be next connected to the engine 4 and which has been been increased in rotational speed as a result that the gear change stage on the lower speed gear stage side is established. Then, when the engine rotational speed Ne comes to be almost equal to the input shaft rotational speed Ni1 or Ni2, the engaging control of the clutch is carried out by the target clutch torque Tce. This target clutch torque Tce has been changed in dependence on the magnitude of the accelerator pressing-down speed Vac and is larger than the target clutch torque Tca for use in the ordinary manipulation of the accelerator P (i.e., as used in the case of the accelerator pressing-down speed Vac being smaller than the the predetermined pressing-down speed threshold value A). In this manner, when the accelerator pressing-down speed Vac being the barometer indicating the driver's will for acceleration is larger, the engine rotational speed Ne of the engine 4 is controlled to come to be almost equal to the the input shaft rotational speed Ni1 or Ni2, and the clutch is engaged by the target clutch torque Tce which has been changed to be larger than the target clutch torque Tca in dependence on the magnitude of the accelerator pressing-down speed Vac. Therefore, the clutch can be connected in a short period of time without suffering shock and without being decreased in torque, so that the driver's demand for acceleration can be satisfied.

If the accelerator pressing-down speed Vac does not exceed the predetermined pressing-down speed threshold value A, the control by the prime mover rotational speed increasing control section 3f is not performed. Then, the engaging control of the clutch is carried out by the target clutch torque Tca (or Tcc) having been calculated by the target clutch torque calculation section 3a. Thus, it is possible to obtain a gentle acceleration feeling meeting the driver's demand.

Further, in the automatic clutch control device 20 according to the first embodiment, in the state that as a result of the accelerator pressing-down speed Vac exceeding the predetermined pressing-down speed threshold value A, the engaging control of the clutch is being performed by the target clutch torque Tce having been changed in dependence on the accelerator pressing-down speed Vac, the controls by the prime mover rotational speed increasing control section 3f and the target clutch torque change calculation section 3g are released if the absolute value of the accelerator pressing-down speed Vac enters at least twice the range between the pressing-down speed threshold value A and the positive release judging threshold value B being smaller than the pressing-down speed threshold value A. Thereafter, the engaging control is performed by the ordinary target clutch torque Tca. That is, the fact that the absolute value of the accelerator pressing-down speed Vac of the accelerator P enters at least twice the range between the pressing-down speed threshold value A and the positive release judging threshold value B indicates that the driver is gently pressing down on and releasing the accelerator P, and it can be judged that a large gear change is not being desired any longer. Thus, the prime mover rotational speed increasing control section 3f and the target clutch torque change calculation section 3g are released from the calculation controls, whereby return is made to the ordinary control. As a result, it is possible to obtain an ordinary feeling meeting the driver's demand.

Further, in the automatic clutch control device 20 according to the first embodiment, in the state that the target clutch torque Tca is calculated and changed by the target clutch torque change calculation section 3g in dependence on the magnitude of the accelerator pressing-down speed Vac, the controls by the prime mover rotational speed increasing control section 3f and the target clutch torque change calculation section 3g are released if the accelerator pressing-down amount Lac changes beyond the predetermined change amount C. In this manner, by grasping the change of the accelerator pressing-down amount Lac beyond the predetermined change amount C, it is judged that the driver is no longer desiring the large acceleration or the gentle acceleration that the driver has demanded until then, and return is made to the ordinary control. As a result, it is possible to obtain a feeling meeting the driver's demand.

Further, the transmission to which the automatic clutch control device 20 according to the first embodiment is applied is the automatic dual clutch transmission 1. In the automatic dual clutch transmission 1, at the time of a gear change, the engagement of the clutch being in connection for one input shaft is released, and at the same time, an engagement is made on the clutch being in disconnection until then for the other input shaft on which the next gear change stage has been established. In this way, the automatic dual clutch transmission 1 is constructed to complete the gear change operation in a short period of time. Therefore, where the automatic clutch control device 20 according to the first embodiment is applied to the automatic dual clutch transmission, the driver's demand for acceleration can be satisfied in addition to the quickness in control of gear change, so that the value of commodity can be enhanced.

Next, description will be made regarding a modified form of the automatic clutch control device 20 according to the first embodiment. From the automatic clutch control device 20 in the first embodiment wherein only one pressing-down speed threshold value A is set, an automatic clutch control device 120 in the modified form differs only in that a plurality of pressing-down speed threshold values are set. Therefore, description will be made regarding the differences only and will be omitted regarding the same portions. Further, description of the same constructions will be made using the same reference numerals.

Figure 8:
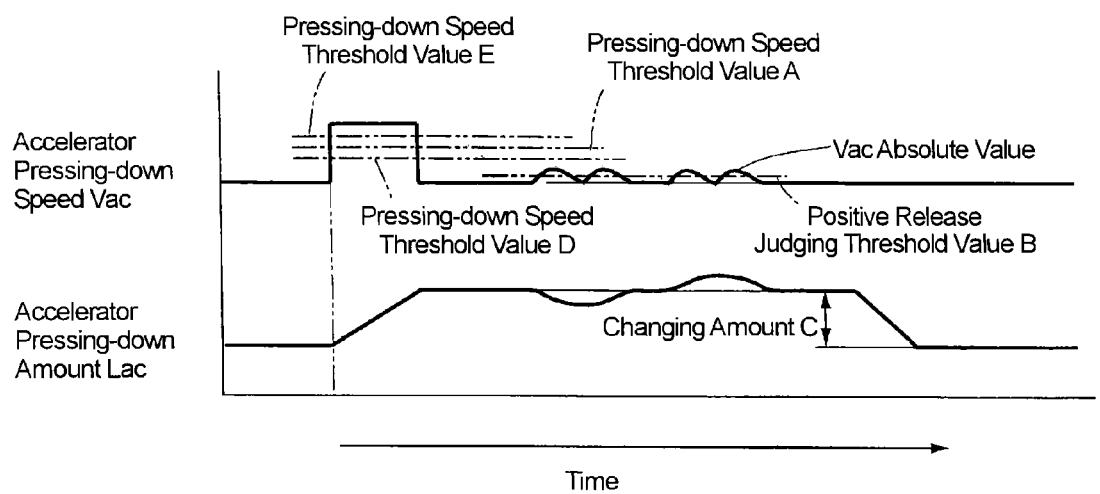
FIG. 8 is a chart for explaining pressing-down speed threshold values D, A and E for the automatic clutch control device in a modified form.

As shown in FIG. 8, the automatic clutch control device 120 has three pressing-down speed threshold values D, A and E (described in order of being smaller in value), for example. Then, if the accelerator pressing-down speed Vac exceeds any one value selected from the pressing-down speed threshold values D, A and E, the gear change control section 3c performs a disconnection control to disconnect the clutch of the first and second clutch discs 41, 42 which corresponds to the input shaft to be disconnected from the engine 4 of the first and second input shafts 21, 22. Then, the prime mover rotational speed increasing control section 3f performs a control to increase the engine rotational speed Ne so that the same comes to be equal to the input shaft rotational speed Ni of the input shaft to be next connected which has been increased by a gear change stage on the slower speed gear stage side, having been established in response to a gear change command for downshift, beyond the input shaft rotational speed Ni before the gear change of the disconnected input shaft. Further, thereafter, in the same manner as in the foregoing first embodiment, the target clutch torque change calculation section 3g changes the target clutch toque Tca in dependence on the magnitude of the accelerator pressing-down speed Vac detected by the accelerator pressing-down speed detecting section 2a. Then, the clutch disc to be engaged next is controlled to be engaged by the target clutch torque Tce so changed and synchronizes the engine rotational speed Ne and the input shaft rotational speed Ni for engagement of the clutch disc. Thus, when the synchronization between the engine rotational speed Ne and the input shaft rotational speed Ni is completed in a short period of time, the engagement is made of the clutch disc so that it is possible to satisfy the driver's demand for acceleration without bringing about an decrease in torque.

Further, if the accelerator pressing-down speed Vac is smaller than any one value selected from the pressing-down speed threshold values D, A and E, the driver can be judged not to be desiring a large acceleration. Thus, the clutch torque Tc is held to remain as the target clutch torque Tca calculated by the target clutch torque calculation section 3a (refer to FIG. 5). Then, the gear change control section 3c performs an engaging control to gently press the clutch disc to be connected next of the first and second clutch discs 41, 42 on the center plate 43 by the target clutch torque Tca to complete the synchronization and the engagement. Therefore, it is possible to realize a gentle acceleration meeting the driver's demand and a gear change mitigated in shock caused by the clutch engagement.

The manner of releasing the prime mover rotational speed increasing control section 3f and the target clutch torque change calculation section 3g from the calculation controls is the same as that in the foregoing first embodiment. That is, after the engaging control of the clutch is performed by the target clutch torque Tce having been changed in dependence on the accelerator pressing-down speed Vac of the accelerator P, if the absolute value of the accelerator pressing-down speed Vac enters at least twice the range between a selected one of the pressing-down speed threshold values D, A and E and the positive release judging threshold value B being smaller than the selected pressing-down speed threshold value D, A or E, the controls by the prime mover rotational speed increasing control section 3f and the target clutch torque change calculation section 3g are released. Thereafter, the engaging control is performed by the ordinary target clutch torque Tca. Thus, it is possible to obtain the ordinary acceleration feeling meeting the driver's demand, so that the same effects as those in the first embodiment can be attained.

In the above, the conditions to select the pressing-down speed threshold values D, A and E can be set in various ways. For example, the pressing-down amount Lac of the accelerator P is added to the conditions, and if the pressing-down amount Lac is large (or small), the pressing-down speed threshold value D for example may be selected so that the transition to the control can be done even if the accelerator pressing-down speed Vac is small. Further, if the pressing-down amount Lac is small (or large), being larger in the accelerator pressing-down speed Vac is set as the condition to proceed to the control, in which case the pressing-down speed threshold value E for example may be selected. Then, the pressing-down speed threshold value A may be set to be selectable when the pressing-down amount Lac of the accelerator P is medium. Further, as another setting method, the vehicle speed is added to the conditions, and if the vehicle speed is high (or low), the pressing-down speed threshold value D for example may be selected so that the transition to the control can be done even if the accelerator pressing-down speed Vac is low. Further, if the vehicle speed is low (or high), being high in the accelerator pressing-down speed Vac is set as the condition to proceed to the control, in which case the pressing-down speed threshold value E may be selected. Then, the pressing-down speed threshold value A may be set to be selectable when the vehicle speed is medium. As described above, the conditions to select the plurality of pressing-down speed threshold values D, A, E may be selected in any way. Further, it is needless to say that the number of the pressing-down speed threshold values may not be limited to three but may be set to two or to four or more.

Further, regarding the gear change control method and the operation of the automatic clutch control device 120, the pressing-down speed threshold value A at step S16 and step S30 in the flow chart shown in FIG. 7 may be changed to read as the pressing-down speed threshold values D, A and E, and the effects achieved there are the same as those in the first embodiment.

In the present embodiment, the drive gears 51, 53, 55, 57 for the odd number stages are fixedly provided on the first input shaft 21, and the drive gears 52, 54, 56 for the even number stages are fixedly provided on the second input shaft 22. Then, the driven gears 61, 63, 65, 67 for establishing the odd number gear change stages in meshing with the odd number stage drive gears on the first input shaft 21 and the driven gears 62, 64, 66 for establishing the even number gear change stages in meshing with the odd number stage drive gears on the second input shaft 22 are freely rotatably provided on the first secondary shaft 31 and the second secondary shaft 32. However, no limitation is made to this mode, and the drive gears 51, 53, 55, 57 and the drive gears 52, 54, 56 may be freely rotatably provided respectively on the first input shaft 21 and the second input shaft 22. Then, in this case, it suffices to provide the 1st speed to 7th speed driven gears 61-67 fixedly on the first secondary shaft 31 and the second secondary shaft 32.

Further, like the automatic dual clutch transmission disclosed in FIG. 1 of JP2011-144872 A, a 7th speed drive gear 26a only may be freely rotatably provided on a first input shaft 15, and a 7th speed driven gear 26b meshing with the 7th speed drive gear 26a may be fixedly provided on a second secondary shaft 18. Furthermore, as shown in FIG. 1 of the publication, there may be taken a construction that the movement of a switching clutch 30D to the right on the drawing sheet brings about a direct connection between the first input shaft 15 and an output shaft 19. The same effects can be attained also in the automatic dual clutch transmission like this.

In the present embodiment, the four fork shafts 135 are provided, and the forks 72a-72d provided on the respective fork shafts 135 are operated individually to perform the switching of each gear stage. However, no limitation is made to this configuration. There may be provided a selection motor, in which case the fork shaft may be selected by the driving of the selection motor, and the selected fork shaft may be slidden by a shifting motor to perform the switching of each gear stage.

Further, the clutch actuator in the present embodiment controls the clutch torque Tc through the adjustment of the clutch actuator operating amount. However, no limitation is made to this configuration. A hydraulic type clutch actuator in which the clutch torque Tc is controlled by adjusting the hydraulic pressure may be applied to the clutch actuator used in the present invention.

Further, although in the present embodiment, the automatic clutch control device according to the present invention is applied to the automatic dual clutch transmission (DCT), the automatic clutch control device 20 is applicable to an automatically controlled manual transmission (AMT: refer to JP2008-75814 A for example). Further, the application is also possible to a transmission which is automated in the clutch manipulation only in a manual transmission in the prior art.

Further, the automatic clutch control device according to the present invention may be applied not to an automatic dual clutch transmission for a vehicle but to an automatic transmission for a motorcycle or the like.

Various features and many of the attendant advantages in the foregoing embodiment and the modified forms will be summarized as follows:

In a first aspect of the foregoing embodiment and the modified form as typically shown in FIGS. 1, 2 and 6-8, when the gear change command for downshift is outputted (Y at S14)

and when the accelerator pressing-down speed Vac is detected to have exceeded the at least one predetermined pressing-down speed threshold value D, A, E (Y at S16), first of all, the clutch 41/42 being in connection is disconnected to disconnect the input shaft 21/22 and the prime mover 4. Then, the prime mover rotational speed Ne is controlled by the prime mover rotational speed increasing control section 3f to come to be equal to the input shaft rotational speed Ni2/Ni1 of the input shaft 22/21 which has been increased in rotational speed beyond the prime mover rotational speed Ne as a result that the lower speed gear stage has been established (S18). Then, when the prime mover rotational speed Ne comes to be equal to the input shaft rotational speed Ni2/Ni1, the engaging control of the clutch 42/41 is performed (S22) by the changed target clutch torque Tce2/Tce1 which has been changed by the target clutch torque change calculation section 3g in dependence on the magnitude of the accelerator pressing-down speed Vac (S20) and which is larger than the target clutch torque Tca calculated by the target clutch torque calculation section 3a. In this way, if the accelerator pressing-down speed Vac being a barometer representing the driver's will for acceleration is larger than the at least one predetermined pressing-down speed threshold value D, A, E (Y at S16), the prime mover rotational speed Ne of the prime mover 4 is controlled to come to be equal to the input shaft rotational speed Ni2/Ni1 (S18), and the clutch 42/41 is engaged (S22) by the changed target clutch torque Tce which has been changed to increase in dependence on the magnitude of the accelerator pressing-down speed Vac (S20). Therefore, the clutch 42/41 can be engaged in a short period of time without bringing about a decrease in torque, so that the driver's demand for acceleration can be fulfilled.

In a second aspect of the foregoing embodiment and the modified form as typically shown in FIGS. 1, 2 and 6-8, after the pressing-down speed Vac of the accelerator P exceeds the at least one predetermined pressing-down speed threshold value D, A, E (Y at S16) and the engaging control of the clutch 42/41 is performed (S22) by the changed target clutch torque Tce2/Tce1 which has been changed in dependence on the accelerator pressing-down speed Vac (S20), the rotational speed increasing control by the prime mover rotational speed increasing control section 3f and the calculation control by the target clutch torque change calculation section 3g are released if the absolute value of the pressing-down speed Vac of the accelerator P pressed down by the driver enters at least twice the range between the at least one predetermined pressing-down speed threshold value D, A, E and the release judging threshold value B being a positive value and being smaller than the at least one predetermined pressing-down speed threshold value D, A, E (Y at S30). That is, the fact that the pressing-down speed Vac of the accelerator P enters at least twice the range between the at least one predetermined pressing-down speed threshold value D, A, E and the release judging threshold value B represents that the drive is pressing down on the accelerator P and returning the same gently, from which it can be judged that the driver is no longer desiring a large acceleration. Therefore, the rotational speed increasing control by the prime mover rotational speed increasing control section 3f and the changing calculation control by the target clutch torque change calculation section 3g are released to return to the ordinary control (S32). Consequently, it is possible to obtain an ordinary acceleration feeling which meets the driver's demand.

In a third aspect of the foregoing embodiment as typically shown in FIG. 6, the at least one predetermined pressing-down speed threshold value D, A, E is one predetermined pressing-down speed threshold value A. Thus, it can be realized to make the control simple, so that the burden in control can be lightened.

In a fourth aspect of the foregoing embodiment as typically shown in FIGS. 1, 6 and 7, the rotational speed increasing control by the prime mover rotational speed increasing control section 3f and the calculation control by the target clutch torque change calculation section 3g are released if the accelerator pressing-down amount Lac changes beyond the predetermined change amount C (Y at S30) after the target clutch torque is changed by the target clutch torque change calculation section 3g in dependence on the magnitude of the accelerator pressing-down speed Vac (S20). In this way, it is grasped that the accelerator pressing-down amount Lac has changed beyond the predetermined change amount C (Y at S30), and return is made to the ordinary control (S32) as a result of judging that the driver is no longer desiring the acceleration he or she demanded in the beginning. Consequently, it is possible to obtain an acceleration feeling meeting the driver's demand.

In a fifth aspect of the foregoing embodiment as typically shown in FIGS. 1 and 2, the transmission described in any one of the first to fourth aspect of the foregoing embodiment is an automatic dual clutch transmission 1. The automatic dual clutch transmission 1 releases and uncouples the engagement of the clutch 41 for one input shaft 21/22 having been connected at the time of a gear change and at the same time, engages the clutch 42 for the other input shaft 22 which has been in a disconnection state and on which the next gear change stage has been established. In this way, the automatic dual clutch transmission 1 is constructed to complete the gear change operation in a short period of time. Therefore, where the automatic clutch control device 20, 120 according to the present invention is applied to the automatic dual clutch transmission 1, it becomes possible to fulfill the acceleration demand demanded by the driver in addition to the quickness in gear change control, so that the value of commodity can be enhanced.

In a sixth aspect of the foregoing embodiment as typically shown in FIG. 7, the gear change control method for the automatic clutch control device 20, 120 achieves the same effects as those of the automatic clutch control device 20, 120 in the first aspect of the foregoing embodiment.

Obviously, further numerous modifications and variations of the present invention are possible in light of the above teachings. It is therefore to be understood that within the scope of the appended claims, the present invention may be practiced otherwise than as specifically described herein.

What is claimed is:
1. An automatic clutch control device, comprising:
a clutch interposed between a driving shaft of a prime mover for a vehicle and an input shaft of a transmission;
a clutch actuator for controlling the disconnection and connection of the clutch;
a target clutch torque calculation section for calculating a target clutch torque;
a gear change control section responsive to a gear change command for controlling a clutch torque transmitted from the prime mover to the input shaft by the operation of the clutch actuator to perform a disconnection control that disconnects the clutch and for controlling the clutch torque to become the target clutch torque to perform an engaging control that synchronizes the prime mover rotational speed of the prime mover with the input shaft rotational speed of the input shaft;

a prime mover rotational speed detecting section for detecting as prime mover rotational speed the rotational speed of the driving shaft of the prime mover;

an input shaft rotational speed detecting section for detecting the input shaft rotational speed of the input shaft;

an accelerator pressing-down speed detecting section for detecting the pressing-down and the pressing-down speed of an accelerator;

a pressing-down speed threshold value judging section for judging whether or not the accelerator pressing-down speed detected by the accelerator pressing-down speed detecting section exceeds at least one predetermined pressing-down speed threshold value, when a downshift gear change command for a gear change from a higher gear stage to a lower gear stage is outputted after the pressing-down of the accelerator is detected;

a prime mover rotational speed increasing control section operated when the accelerator pressing-down speed exceeds the at least one predetermined pressing-down speed threshold value, for disconnecting the input shaft and the prime mover by the disconnection control of the clutch and then for controlling the prime mover rotational speed to increase and come to be equal to the input shaft rotational speed of the input shaft which has been increased by the lower speed gear stage, having been established in response to the gear change command, beyond the input shaft rotational speed before the gear change; and a target clutch torque change calculation section for calculating a change amount that changes the target clutch torque in dependence on the magnitude of the accelerator pressing-down speed.

2. The automatic clutch control device as set forth in claim 1, wherein in calculating the target clutch torque, the target clutch torque calculation section calculates a target inertia torque by multiplying an inertia of the prime mover with a target rotational speed changing speed of the prime mover in a gear change and then calculates as the target clutch torque a value made by subtracting the target inertia torque from a current output torque which is presently in the prime mover.

3. The automatic clutch control device as set forth in claim 2, further comprising:

an accelerator pressing-down amount detecting section for detecting an accelerator pressing-down amount of the accelerator;

wherein when the target clutch torque change calculation section changes the target clutch torque in dependence on the magnitude of the accelerator pressing-down speed and then, the accelerator pressing-down amount of the accelerator changes beyond a predetermined change amount, controls by the prime mover rotational speed increasing control section and the target clutch torque change calculation section are released and the engaging control is performed by the target clutch torque which has been calculated by the target clutch torque calculation section.

4. The automatic clutch control device as set forth in claim 1, wherein:

when after the pressing-down speed of the accelerator exceeds the at least one predetermined pressing-down speed threshold value, an absolute value of the pressing-down speed enters at least twice a range between the at least one predetermined pressing-down speed threshold value and a release judging threshold value being a positive value and being smaller than the at least one predetermined pressing-down speed threshold value, controls by the prime mover rotational speed increasing control section and the target clutch torque change calculation section are released and the engaging control is performed by the target clutch torque which has been calculated by the target clutch torque calculating section.

5. The automatic clutch control device as set forth in claim 1, wherein the at least one predetermined pressing-down speed threshold value comprises one predetermined pressing-down speed threshold value only.

6. The automatic clutch control device as set forth in claim 1, wherein:

the transmission includes a first input shaft and a second input shaft arranged coaxially; a first shift mechanism for changing the speed of a rotational driving force transmitted to the first input shaft to establish odd number gear change stages; and a second shift mechanism for changing the speed of the rotational driving force transmitted to the second input shaft to establish even number gear change stages;

the clutch comprises a dual clutch having a first clutch for transmitting the rotational driving force of the prime mover as an output driving force to the first input shaft and a second clutch for transmitting the rotational driving force to the second input shaft; and the gear change control section is responsive to the gear change command for performing a disconnection control to disconnect the clutch of the first and second clutches which corresponds to the input shaft to be disconnected from the prime mover of the first and second input shafts, and for performing an engaging control to control the clutch of the first and second clutches which corresponds to the input shaft to be connected to the prime mover of the first and second input shafts, so that the clutch torque becomes the target clutch torque to synchronize the rotational speed of the input shaft to be connected with the rotational speed of the prime mover.

7. A gear change control method for an automatic clutch control device comprising a clutch interposed between a driving shaft of a prime mover for a vehicle and an input shaft of a transmission; a clutch actuator for controlling disconnection and connection of the clutch; a target clutch torque calculation section for calculating a target clutch torque; a gear change control section responsive to a gear change command for controlling a clutch torque transmitted from the prime mover to the input shaft by the operation of the clutch actuator to perform a disconnection control that disconnects the clutch, and for controlling the clutch torque to become the target clutch torque to perform an engaging control that synchronizes the prime mover rotational speed of the prime mover with the input shaft rotational speed of the input shaft; a prime mover rotational speed detecting section for detecting the rotational speed of the driving shaft of the prime mover as prime mover rotational speed; and an input shaft rotational speed detecting section for detecting the input shaft rotational speed of the input shaft;

wherein the method comprises:

an accelerator pressing-down speed detecting step of detecting the pressing-down and the pressing-down speed of the accelerator;

a pressing-down speed threshold value judging step of judging whether or not the accelerator pressing-down speed detected by the accelerator pressing-down speed detecting step exceeds at least one predetermined pressing-down speed threshold value, when a downshift gear change command for a gear change from a higher gear stage to a lower gear stage is outputted after the pressing-down of the accelerator is detected;

a prime mover rotational speed increasing control step of, when the accelerator pressing-down speed exceeds the at least one predetermined pressing-down speed threshold value, disconnecting the input shaft and the prime mover by the disconnection control of the clutch and then controlling the prime mover rotational speed to increase and come to be equal to the input shaft rotational speed of the input shaft which has been increased by the lower speed gear stage, having been established in response to the gear change command, beyond the input shaft rotational speed before the gear change; and a target clutch torque change calculation step of calculating a change amount that changes the target clutch torque in dependence on the magnitude of the accelerator pressing-down speed.

8. The gear change control method in claim 7, wherein in calculating the target clutch torque, the target clutch torque calculation section calculates a target inertia torque by multiplying an inertia of the prime mover with a target rotational speed changing speed of the prime mover in a gear change and then calculates as the target clutch torque a value made by subtracting the target inertia torque from a current output torque which is presently in the prime mover.

* * * * *